(12) United States Patent
Gloo et al.

(10) Patent No.: US 8,098,155 B2
(45) Date of Patent: Jan. 17, 2012

(54) SYSTEM AND METHOD FOR LOCATING A TARGET WIRELESS DEVICE

(75) Inventors: Richard Michael Gloo, Mohawk, NY (US); Jacob Michael Baker, Rome, NY (US); Alexander James Williams, Schenectady, NY (US); Jason S. Lashure, Marcy, NY (US); Robert James Durham, Rome, NY (US); Nicholas Lawrence Owens, Rome, NY (US)

(73) Assignee: Assured Information Security, Inc., Rome, NY (US)

( * ) Notice: Subject to any disclaimer, the term of this patent is extended or adjusted under 35 U.S.C. 154(b) by 422 days.

(21) Appl. No.: 12/472,060

(22) Filed: May 26, 2009

(65) Prior Publication Data

US 2010/0302014 A1 Dec. 2, 2010

(51) Int. Cl.
G08B 1/08 (2006.01)
H04M 11/04 (2006.01)
H04W 24/00 (2009.01)

(52) U.S. Cl. ......... 340/539.21; 340/539.11; 340/539.13; 455/404.2; 455/456.1; 455/457; 342/386; 342/417; 342/451

(58) Field of Classification Search .............. 340/539.21
See application file for complete search history.

(56) References Cited

U.S. PATENT DOCUMENTS

| 4,954,836 | A | 9/1990 | Sakuma |
|---|---|---|---|
| 5,448,248 | A | 9/1995 | Anttila |
| 6,141,558 | A | 10/2000 | Chen |
| 7,058,796 | B2 | 6/2006 | Lynn |
| 7,072,669 | B1 | 7/2006 | Duckworth |
| 7,322,044 | B2 | 1/2008 | Hrastar |
| 2004/0160363 | A1 | 8/2004 | Powers et al. |
| 2006/0128354 | A1 | 6/2006 | Carle et al. |

FOREIGN PATENT DOCUMENTS

FR 2688892 A1 9/1993

OTHER PUBLICATIONS

Yasar et al, "Low Cost Solution for location Determination of Mobile Nodes in a Wireless Local Area Network" (ACE 06, Jun. 14-16, 2006, Hollywood, CA, USA).

Rick Hill, GeoLocation of Wireless Access Points and "Wireless GeoCaching."

(Continued)

*Primary Examiner* — Donnie Crosland

(74) *Attorney, Agent, or Firm* — Blanche E. Schiller, Esq.; Heslin Rothenberg Farley & Mesiti P.C.

(57) ABSTRACT

A method for locating a target wireless device is disclosed. At least one directional antenna is swept through a field of view at each of a plurality of sensing locations. A position is determined for each of the plurality of sensing locations. During the sweep at each of the plurality of sensing locations, a set of signal strength data for the target wireless device and a set of bearing information are collected. A plurality of lines of bearing are determined, one from each of the plurality of sensing locations to the target wireless device, based on the determined position, the collected set of signal strength data, and bearing information for each of the plurality of sensing locations. A target location of the target wireless device is determined based on an intersection of at least two lines of bearing from the plurality of lines of bearing.

40 Claims, 17 Drawing Sheets

OTHER PUBLICATIONS

Elnahrawy et al, "Adding Angle of Arrival Modality to Basic RSS Location Management Techniques" (Department of Computer Science, Rutgers University, Piscataway, NJ 08854).

Satoh et al., "Position Estimation of Wireless Access Point using Directional Antennas" (Graduate School of Information Science, Nagoya University, Nagoya, Japan; Information Technology Center, Nagoya University, Nagoya, Japan).

Gwon et al., "Error Characteristics and Calibration-free Techniques for Wireless LAN-based Location Estimation" (MobiWac '04, Oct. 1, 2004, Philadelphia, PA, USA).

King et al., "Compass: A Probabilistic Indoor Positioning System Based on 802.11 and Digital Compasses" (WiNTECH '06, Sep. 29, 2006, Los Angeles, CA, USA).

Ferris et al., "Gaussian Processes for Signal Strength-Based Location Estimation" (University of Washington, Department of Computer Science & Engineering, Seattle, WA; Intel Research Seattle, Seattle, WA).

Byers et al., "802.11B Access Point Mapping" (Communications of the ACM, May 2001, vol. 46, No. 5).

Faria et al., "Detecting Identity-Based Attacks in Wireless networks Using Signalprints" (WiSe '06, Sep. 29, 2006, Los Angeles, CA, USA).

An et al., "A Geocast Architecture for Mobile Cellular Networks" (NGC '00, 11/00, Palo Alto, CA, USA).

Haeberlen et al., "Practical Robust Localization over Large-Scale 802.11 Wireless Networks" (MobiCom '04, Sep. 26-Oct. 1, 2004, Philadelphia, PA, USA).

Astrain et al., "Fuzzy Location and Tracking on Wireless Networks" (MobiWAC '06, Oct. 2, 2006, Torremolinos, Malaga, Spain).

Agiwal et al., "Locator—Location Estimation System for Wireless LANs" (WMASH '04, Oct. 1, 2004, Philadelphia, PA, USA).

Nasipuri et al., "A Directionality based Location Discovery Scheme for Wireless Sensor Networks" (WSNA '02, Sep. 28, 2002, Atlanta, GA, USA).

Moustafa Youssef & Ashok Agrawala, "The Horus WLAN Location Determination System" (Department of Computer Science, University of Maryland, College Park, MD, USA).

Záruba et al., "Indoor location tracking using RSSI reading from a single Wi-Fi access point" (Published online: Jun. 8, 2006, Springer Science + Business Media, LLC 2007).

Kozma et at., "Geometrically Aware Communication in Random Wireless Networks" (PODC '04, Jul. 25-28, 2004, St. Johns, Newfoundland, Canada).

Song et al., "Localized Algorithms for Energy Efficient Topology in Wireless Ad Hoc Networks" (Mobile Networks and Applications 10,911-923,2005).

Schloter et al., "Wireless Symbolic Positioning using Support Vector Machines" (IWCMC'06, Jul. 3-6, 2006, Vancouver, British Columbia, Canada).

Bishop et al., "A Discussion on Passive Location Discovery in Emitter Networks Using Angle-Only Measurements" (IWCMC '06, Jul. 3-6, 2006, Vancouver, British Columbia, Canada).

Lamarca et al., "Self-Mapping in 802.11 Location Systems" (Intel Research Seattle).

Krumm et al., "Minimizing Calibration Effort for an Indoor 802.11 Device Location Measurement System" (Microsoft Research, Microsoft Corporation, Redmond, WA 98052).

de Moraes et at., "Calibration-Free WLAN Location System Based on Dynamic Mapping of Signal Strength" (MobiWac '06, Oct. 2, 2006, Torremolinos, Malaga, Spain).

International Search Report and Written Opinion for PCT/US2010/036161 dated Oct. 11, 2010.

SYSTEM AND METHOD FOR LOCATING A TARGET WIRELESS DEVICE

GOVERNMENT SUPPORT

This invention was made with government support under United States Government contract number FA8750-07-C-0192. The government has certain rights in the invention.

FIELD

The claimed invention generally relates to methods and systems for locating wireless devices.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

When thinking about cyber crimes, it is common to think about illegal hacking into a secured computer system to view or steal information. Others may perhaps think about the creation of computer viruses which are then set loose on networks or the internet to slow down computer systems, tie up communication bandwidth, or erase computer data. Cyber crimes have also expanded to include a range of activities from the stealing of internet service, to inappropriate contact with children or the posting of child pornography on the internet.

While law enforcement officials have become increasingly vigilant for cyber crimes, their ability to track down and catch cyber criminals is hampered by a proliferation of wireless technology which is being used to access computer networks. For example, police officers are often able to identify illegal cyber activity and trace it back to a source location, for example, a street address associated with a broadband modem that has been linked to the cyber crime. Often, however, once the officers investigate the residence or business at the located street address, they find that a wireless access point has been installed at the location and that the people at the residence or business do not own or have the wireless device which was connecting to the wireless access point and committing the cyber crime. Once the people at that location are cleared, the police unfortunately do not have a way to trace the offending device and user which are or were connecting to the wireless access point.

With the proliferation of wireless access points and other wireless technologies, it is becoming even easier for criminals to commit cyber crimes. Furthermore, there is increasingly a cyber component to traditional crimes. For example, more criminals are taking advantage of wireless voice-over-IP technology to have untraceable phone calls. Even terrorists are taking advantage of wireless technology to detonate explosive devices. Sadly, as many as 95% of cyber crimes are believed to go unsolved due to such difficulties, and law enforcement officials are in great need of tools not only to help them identify the source of such threats, but also to locate the perpetrators themselves so that the criminals may be apprehended and the cyber crimes prevented.

Therefore, it would be very desirable to have an economical, flexible, potentially portable, and easy to use method and system for locating a target wireless device.

SUMMARY

A method for locating a target wireless device is disclosed. At least one directional antenna is swept through a field of view at each of a plurality of sensing locations. A position for each of the plurality of sensing locations is determined. During the sweep at each of the plurality of sensing locations, a set of signal strength data for the target wireless device and a set of bearing information are collected. A plurality of lines of bearing are determined, one from each of the plurality of sensing locations to the target wireless device, based on the determined position, collected set of signal strength data, and bearing information for each of the plurality of sensing locations. A target location of the target wireless device is determined based on an intersection of at least two lines of bearing from the plurality of lines of bearing.

An apparatus for locating a target wireless device is also disclosed. The apparatus has a directional antenna configured to be swept through a field of view at each of a plurality of sensing locations. The apparatus also has a positioning system configured to determine each of the plurality of sensing locations. The apparatus also has a compass configured to determine bearing information for the directional antenna. The apparatus further has a user interface. The apparatus also has a processor coupled to the directional antenna, the positioning system, the compass, and the user interface. The processor is configured to 1) collect a set of signal strength data for transmissions received from the target wireless device by the directional antenna during a sweep of the directional antenna at each of the plurality of sensing locations; 2) determine a position from the positioning system for each of the plurality of sensing locations; 3) collect a set of bearing information from the compass for each set of signal strength data; 4) determine a plurality of lines of bearing, one from each of the plurality of sensing locations to the target wireless device, based on the determined position, the collected set of signal strength data, and collected set of bearing information for each of the plurality of sensing locations; 5) determine a target location of the target wireless device based on an intersection of at least two lines of bearing from the plurality of lines of bearing; and 6) display the target location on the user interface.

A system for locating a target wireless device is also disclosed. The system has a plurality of directional antennas, each configured to be swept through a field of view at one or more sensing locations. The system also has a plurality of compasses configured to determine bearing information for the plurality of directional antennas. The system further has at least one user interface. The system also has at least one processor coupled to the plurality of directional antennas, at least one of the plurality of compasses, and the at least one user interface. The at least one processor is configured to 1) collect multiple sets of signal strength data from transmissions received from the target wireless device by the plurality of directional antennas during a sweep of the plurality of directional antennas at the one or more sensing locations; 2) collect multiple sets of bearing information from the plurality of compasses, each of the sets of bearing information corresponding to one of the multiple sets of signal strength data; 3) determine a plurality of lines of bearing, one from each of the one or more sensing locations to the target wireless device, based on the collected sets of signal strength data and bearing information for each of the plurality of sensing locations; 4)

determine a target location of the target wireless device based on an intersection of at least two lines of bearing from the plurality of lines of bearing; and 5) display the target location on the at least one user interface.

A set of instructions, embodied on a computer readable medium, for locating a target wireless device are also disclosed. The set of instructions includes instructions for sweeping at least one directional antenna through a field of view at each of a plurality of sensing locations. The set of instructions also includes instructions for determining a position for each of the plurality of sensing locations. The set of instructions also includes instructions for collecting a set of signal strength data for the target wireless device and a set of bearing information during the sweep at each of the plurality of sensing locations. The set of instructions further includes instructions for determining a plurality of lines of bearing, one from each of the plurality of sensing locations to the target wireless device, based on the determined position for each of the plurality of sensing locations, the collected set of signal strength data for each of the plurality of sensing locations, and bearing information for each of the plurality of sensing locations. The set of instructions also includes instructions for determining a target location of the target wireless device based on an intersection of at least two lines of bearing from the plurality of lines of bearing.

A graphical user interface is disclosed for use on an apparatus for locating a target wireless device, the apparatus having a directional antenna. The graphical user interface has a device list configured to display information identifying one or more wireless devices. The graphical user interface also has bearing information for the directional antenna. The graphical user interface further has a signal strength indicator for wireless transmissions received by the directional antenna. The graphical user interface also has a lock control configured to select one of the one or more identified wireless devices as the target wireless device for location and to initiate the determination of one or more lines of bearing toward the target wireless device. The graphical user interface also has a coordinate display configured to show a location of the target wireless device as determined from an intersection of a plurality of the one or more lines of bearing.

Figure 1:
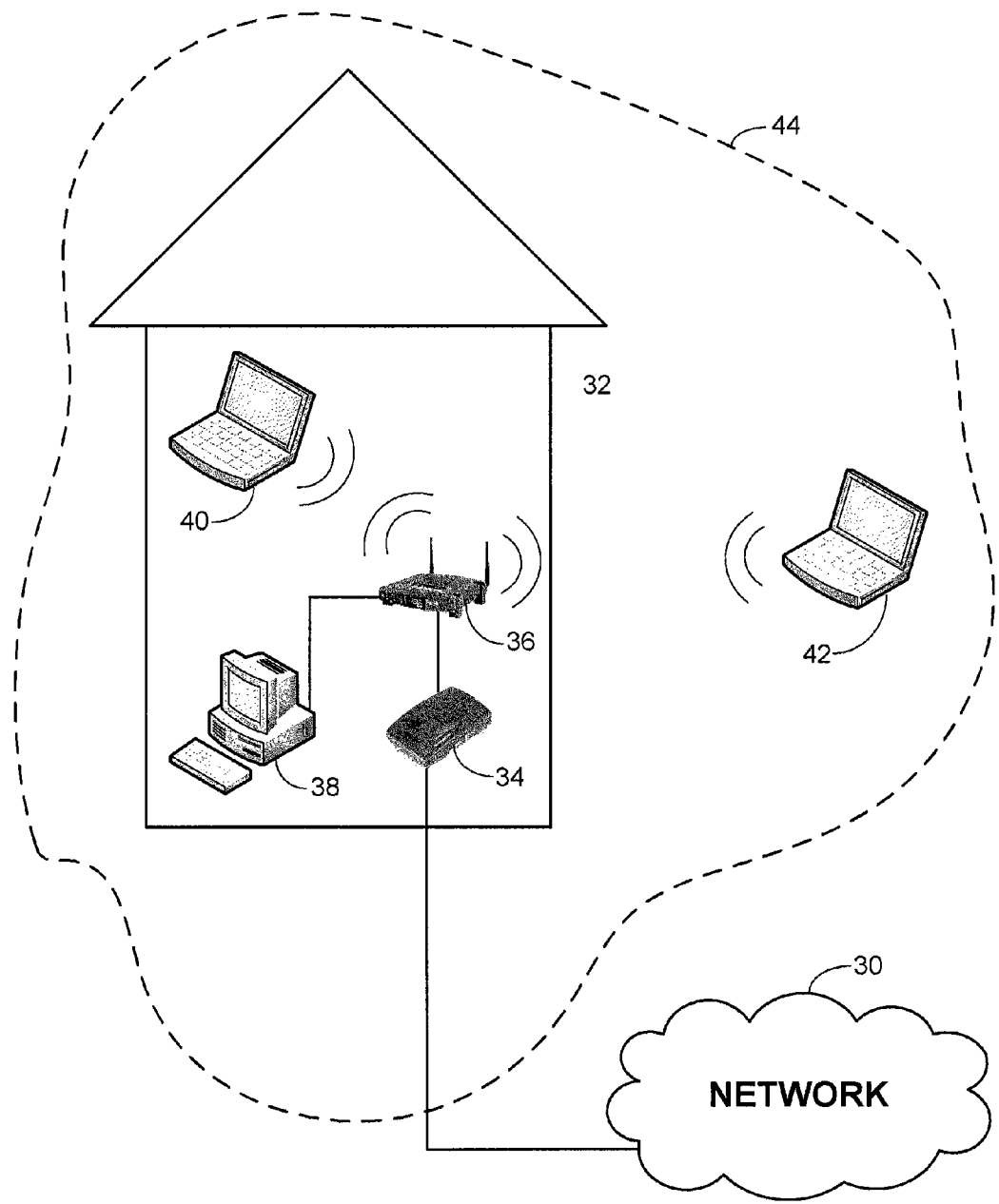
FIG. 1 schematically illustrates wireless devices communicating.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

Generally speaking, there are many different types of wireless devices and many different ways that the wireless devices communicate. Some examples of wireless devices include wireless laptop computers, wireless workstations, personal digital assistants (PDA's), wireless digital cameras, wireless hard drives, wireless video cameras, wireless routers and gateways, voice-over-IP phones, and cellular phones. Wireless devices could also include custom or modified wireless devices such as a wireless explosives detonator. Wireless devices communicate using radio frequency (RF) transmissions on one or more frequencies or channels. Wireless devices typically communicate using one or more protocols which define the format of the data transmitted wirelessly using the RF transmissions. Examples of wireless protocols include, but are not limited to 802.11x, Zigbee, WiMax/802.16, Bluetooth®, CDMA, and GSM. A single wireless device may be configured to communicate wirelessly using more than one protocol. For ease of explanation, many of the embodiments described herein are described with respect to 802.11x (also referred-to as WiFi), however it should be understood that the embodiments may also be implemented using other protocols.

Two wireless devices which use the same protocol may communicate wirelessly. A common scenario for wireless communication is illustrated in FIG. 1. In this illustrative example, physical connection to a network 30 is provided to a building 32 by a modem 34. The network 30 could be a local area network (LAN) such as an intranet, or the network 30 could be a wide area network (WAN) such as the internet. A router 36 is wired to a computer 38 to couple the computer 38 to the network 30 via the modem 34. The router 36 also supports wireless connectivity through one or more protocols over one or more frequencies or channels. The router 36 can support connectivity with multiple wireless devices, such as a first laptop 40 and a second laptop 42 as long as the wireless devices are within the coverage area 44 of the router 36. The router 36 can differentiate between communications from the first laptop 40 and the second laptop 42 because each wireless device has a unique identifier, such as a media access control (MAC) address, internet protocol (IP) address, or service set identifier (SSID) which is transmitted as part of the wireless communications.

All communication traffic from the devices 38, 40, 42 to the network 30 is typically tied to a unique identifier for the modem 34, which is often in a known location such as building 32. Therefore, if any of the devices 38, 40, 42 engage in illegal activity, methods currently exist to determine the location of the modem 34 or access point 36 physically tied to the modem 34 based on unique identifier information accompanying the communications with the network 30. Once the building 32 is located, the MAC addresses, or other unique identifiers, of the local devices 38 and 40 may be examined to determine if these devices are the ones used to engage in the criminal activity. Unfortunately, if a wireless device 42 outside of the building 32 is the offending device, then its location can remain unknown to law enforcement officials since they may not know where to look in the coverage area 44 or further may not have the right to search adjacent buildings, apartments, or other areas without just cause and a warrant. It should be noted that the building 32 is only used for illustration purposes and that the problem of locating a target wireless device can exist whether or not the access point is within a building or without and whether or not the target device is within the same building or not, or even if it is outside.

Figure 2:
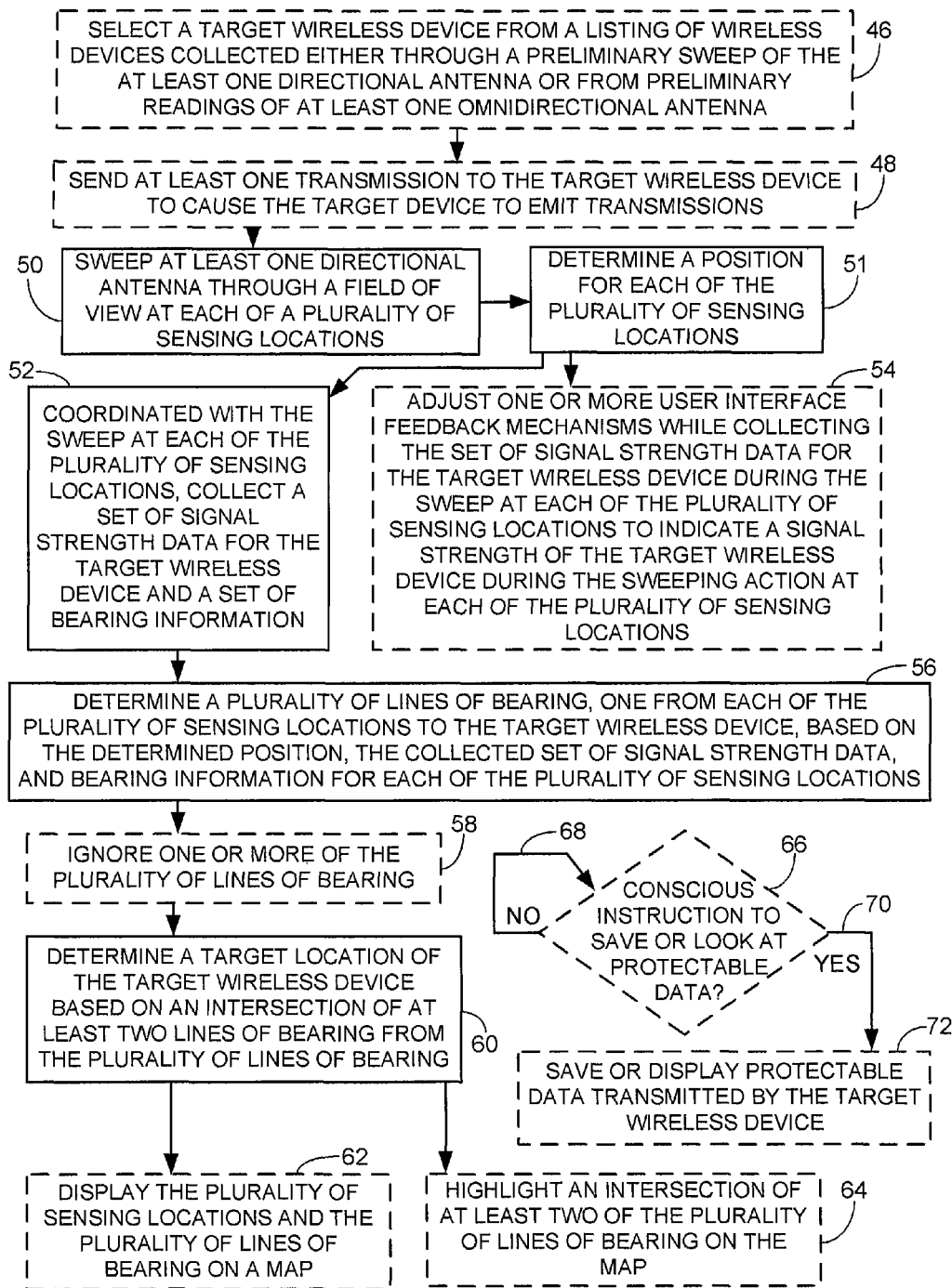
FIG. 2 illustrates one embodiment of a method for locating a target wireless device.

FIG. 2 illustrates one embodiment of a method for locating a target wireless device. Optionally, a target wireless device may be selected 46 from a listing of wireless devices collected either through a preliminary sweep of at least one directional antenna or from preliminary readings of at least one omnidirectional antenna. A directional antenna is one which transmits and receives RF signals to/from a limited angle. One non-limiting example of a suitable directional antenna for this purpose is a 2.4 GHz 15 dBi Radome enclosed Yagi antenna manufactured by Hyperlink Technologies part number HG2415Y. A second non-limiting example of a suitable directional antenna for this purpose is a 2.4 GHz 18 dBi Panel antenna manufactured by L-com part number HG2418P. Since a directional antenna can not receive signals well from every direction, it is recommended to make a preliminary sweep of the directional antenna over a field of view, preferably 360 degrees, to maximize the number of wireless devices in the area which may be listed for selection. By contrast, an omnidirectional antenna is one which transmits and receives over substantially all angles simultaneously. If an omnidirectional antenna is used to collect a number of wireless devices for selection, then the omnidirectional antenna does not need to be swept through any field of view. Information on which wireless device to select as the target wireless device from the list of wireless devices may come from association of the unique identifier of the wireless device with illegal activity as described above.

Preferably, no transmissions are sent to the target wireless device so that the location process has a higher chance of going undetected by the target wireless device. Although it is preferred to operate in such a passive mode, it may sometimes be difficult to locate a suspected target wireless device if that device is not transmitting or if that device is transmitting infrequently. Therefore, optionally, at least one transmission may be sent 48 to the target wireless device to cause the target device to emit transmissions. In the case of the 802.11 protocol, one example of a transmission which could cause the target wireless device to transmit is the sending of an unauthenticated data frame to the target wireless device. The protocol manager on the target wireless device could be set to automatically respond to such an unauthenticated data frame, thereby providing transmissions for use in the location method.

At least one directional antenna is swept 50 through a field of view at a plurality of sensing locations. Although the antenna sweep 50 at each of the sensing locations is preferably at least 360 degrees, the method can work when the antenna sweep is at least 360 degrees at only one of the sensing locations, or even when the antenna sweep is less than 360 degrees at each of the sensing locations, although this may reduce accuracy in some instances. The antenna sweep at the plurality of sensing locations may be performed by the same directional antenna which is moved from one sensing position to the next sensing position and so on. Alternatively, the antenna sweep at the plurality of locations may be performed by multiple directional antennas, each one at a different sensing location. The sweeping action may be completed by manually sweeping the at least one directional antenna through the field of view at the one or more of the plurality of sensing locations. Alternatively, the sweeping action may be completed by dynamically beam steering the at least one directional antenna through the field of view at the one or more of the plurality of sensing locations. Phased antenna arrays are one example of a type of directional antenna which may be beam steered electronically to sweep an area. Alternatively, the sweeping action may be completed by electro-mechanically sweeping the at least one directional antenna through the field of view at the one or more of the plurality of locations. For example, the directional antenna could be motor rotatable or pivotable by solenoid action. The sweep of the directional antenna is preferably performed substantially horizontally through the field of view. A position is also determined 51 for each of the plurality of sensing locations. Position of the sensing locations may be may be gathered, for example, by using a global positioning system (GPS), an enhanced GPS system that uses cellular tower transmissions along with the GPS, an inertia-based dead reckoning system, survey benchmarks, or a dedicated radio frequency (RF)-based location system.

Coordinated with the sweep at each of the sensing locations, a set of signal strength data for the target wireless device and a set of bearing information are collected 52. The set of bearing information includes a set of compass bearings, each compass bearing corresponding to the heading of the directional antenna for each of the signal strength data readings. The set of compass bearings may be gathered by a compass, such as a digital compass.

Optionally, one or more user interface feedback mechanisms are adjusted 54 while collecting the set of signal strength data for the target wireless device during the sweep at each of the plurality of sensing locations in order to indicate a signal strength of the target wireless device during the sweeping action at each of the plurality of sensing locations. One example of a suitable user interface feedback mechanism could include a graph or meter which illuminates, populates, or changes color in proportion to the received signal level from the target wireless device. Another example of a suitable user interface feedback mechanism could include an auditory alert or a vibrating alert which also changes in proportion to the received signal level from the target wireless device. Alerts which are quiet or mutable may be preferred so the operator of equipment implementing this location method is less likely to be detected by a user of the target wireless device. The feedback in proportion to signal strength can also assist the operator in knowing if the swept field of view is sufficient to have encompassed the maximum signal strength.

A plurality of lines of bearing are determined 56, one from each of the plurality of sensing locations to the target wireless device, based on the determined position, the collected set of signal strength data, and the collected bearing information for each of the plurality of sensing locations. Generally, one of the bearings during each sweep at a given location will have a maximum signal strength of all the signal strengths collected, and that bearing, as measured from the position of the sensing location, may constitute a line of bearing to the target wireless device. Other embodiments may use statistical analysis or filtration techniques in the line of bearing determination. One such example will be described with regard to FIG. 8 later in this specification. Optionally, one or more of the plurality of lines of bearing may be ignored 58. This may be desirable if there is an outlier line of bearing, for example one determined based on an apparent signal reflection which does not agree with other determinations or one which is caused by movement of the target wireless device.

A target location of the target wireless device is determined 60 based on an intersection of at least two lines of bearing from the plurality of lines of bearing. Preferably, the lines of bearing are determined from a plurality of sensing locations which are separated enough to give a clear point of intersection between the multiple lines of bearing. As just one non-limiting example, in comparison to a first sensing location, a second sensing location may be chosen to be substantially on a vector which is approximately forty-five degrees away from a first line of bearing as measured from a first sensing location. Other methods of selecting sensing locations may also be used.

The plurality of sensing locations and the plurality of lines of bearing may optionally be displayed 62 on a map. Furthermore, an intersection of at least two of the plurality of lines of bearing may be highlighted 64 on the map by using a graphic symbol, color change, brightness change, or on-screen movement.

Once the target location for the target wireless device is known, it may then optionally be possible, in a law enforcement scenario, to obtain a warrant to start saving or looking at otherwise protectable data transmitted by the target wireless device. In normal operation, the described method may be used on transmissions from the target wireless device which are wrapped in a protocol frame of some type, such as a control frame, a management frame, or a data frame. In some embodiments, the described method may alternatively be used with signal data that is collected at the physical. In the case where packets or protocol frames are used, the packet or frame includes a unique identifier which enables the method to only look at transmissions from the target wireless device while ignoring transmissions from other devices. The data does not have to be looked-at or stored in any way which would violate privacy rights. Therefore, the method may optionally be equipped with a decision 66 to check for a conscious instruction to save or look at the protectable data. While the conscious decision 66 remains negative 68 no protectable data will be stored or looked at. Once the location of a target wireless device is known, however, and a warrant is obtained or other suitable legal requirement is met, the conscious decision can be made 70 to save and/or display 72 protectable data transmitted by the target wireless device.

Figure 3:
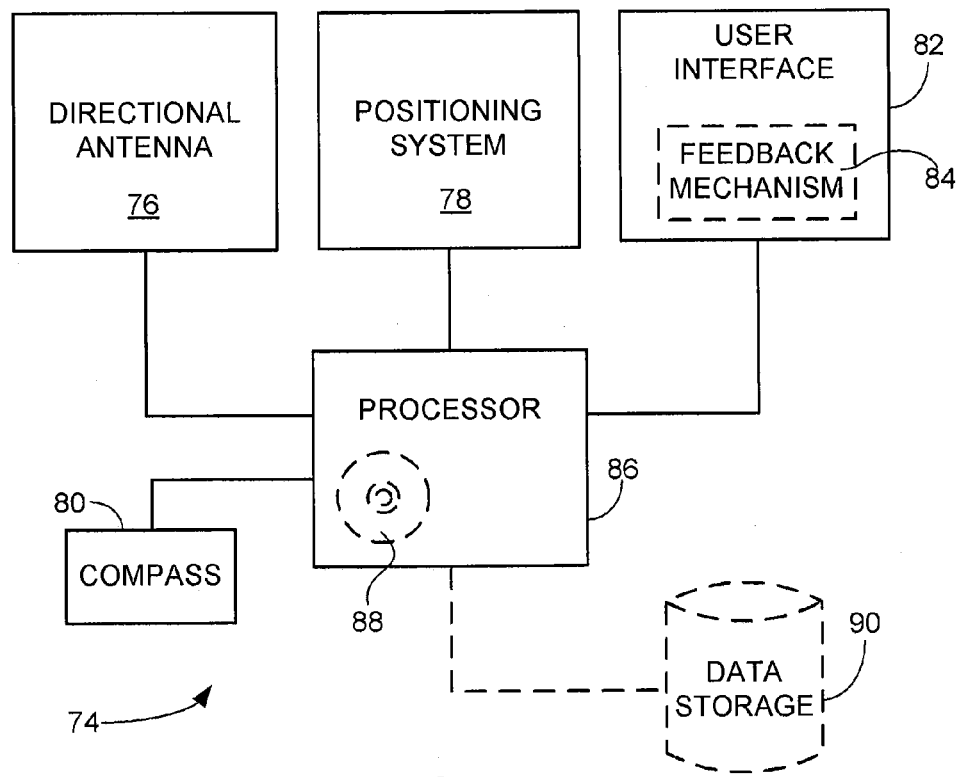
FIG. 3 schematically illustrates one embodiment of an apparatus for locating a target wireless device.

FIG. 3 schematically illustrates one embodiment of an apparatus 74 for locating a target wireless device. The location apparatus 74 has a directional antenna 76 configured to be swept through a field of view at each of a plurality of sensing locations. As described above, the directional antenna 76 may be manually sweepable, dynamically beam steerable, or electromechanically sweepable. The apparatus 74 also has a positioning system 78 configured to determine each of the plurality of sensing locations for the directional antenna 76. The positioning system 78 may be a GPS system, an enhanced GPS system, an inertia-based dead reckoning system, survey benchmarks, a dedicated radio frequency (RF)-based location system, or a combination thereof. The location apparatus 74 also has a compass 80 configured to determine bearing information for the directional antenna 76. The compass 80 may be a separate component as illustrated in this embodiment, or the compass 80 may be integrated with the positioning system 78 or the directional antenna 76. The apparatus 74 also has a user interface 82 for displaying a variety of information, depending on the embodiment. For example, numerical representations of sensing position and line of bearing may be displayed in some embodiments. In other embodiments, such numeric information may be transformed and displayed pictorially as a marked position and a line of bearing on a map. Target locations determined through line of bearing intersection may optionally be displayed on the user interface 82, and direction and/or distance from a current position to a target location may also be displayed numerically or graphically to assist in navigating to the target location. The user interface 82 may optionally include a feedback mechanism 84 for indicating signal strength of received transmissions from the target wireless device. The benefits of such a feedback mechanism have been discussed previously. The user interface 82 may also include a list of wireless devices from which the target wireless device is selectable. This may be helpful when scanning in an area which has many wireless devices so that the target wireless device may be optionally highlighted and/or visually locked-onto.

The location apparatus 74 has a processor 86 which is coupled to the directional antenna 76, the positioning system 78, and the user interface 82. The processor 86 may be a desktop computer, laptop computer, notebook computer, tablet computer, personal digital assistant (PDA), microprocessor, application specific integrated circuit (ASIC), digital circuitry, analog circuitry, or any combination or plurality thereof which are preferably at least capable of 1) interfacing with the directional antenna 76 at least for sending and/or receiving wireless data and optionally steering the directional antenna 76; 2) interfacing with the positioning system 78 at least for receiving position data; 3) interfacing with the compass 80 at least for receiving bearing information; and 4) interfacing with the user interface 82 for receiving user commands and outputting information related to the target location. The processor 86 may also include a computer readable medium 88 containing a set of instructions for locating a target wireless device. The computer readable medium 88 may be an ASIC, read-only-memory (ROM), a programmable logic array, a memory card, a randomly accessible memory (RAM), a diskette, an optical disk, a tape, or the functional equivalent of any of these devices. The computer readable medium 88 may be removable or internal to the location apparatus 74. For simplicity, the processor is schematically illustrated as a single element block in FIG. 3, however it should be understood that the processor 86 may include multiple processors, as defined herein, the multiple processors being locally or remotely distributed. The processor 86 may have its own internal data storage and/or the processor 86 may be coupled to an optional data storage 90. The optional data storage 90 may be local, remote, and/or distributed among several storage devices. As just some examples, the data storage 90 may be a hard disk, a database, an optical disc, an internal memory, or a removable memory. The data storage 90 may be especially helpful when the conscious decision is made to save or look at protectable data from the target wireless device since storage space may be at a premium in the processor 86 if large amounts of data are collected.

The processor 86 is configured to collect a set of signal strength data for transmissions received from the target wireless device by the directional antenna 76 during a sweep of the directional antenna 76 at each of the plurality of sensing locations. The processor 86 is also configured to determine a position from the positioning system 78 for each of the plurality of sensing locations. The processor 86 is also configured to collect a set of bearing information from the compass 80 for each set of signal strength data. Signal strength measurements will be made in conjunction with the sweep of the directional antenna 76 at the sensing location. The processor 86 is further configured to determine a plurality of lines of bearing, one from each of the plurality of sensing locations to the target wireless device, based on the determined position, the collected set of signal strength data, and the collected set of bearing information for each of the plurality of sensing locations. The processor 86 is configured to determine a target location of the target wireless device based on an intersection of at least two lines of bearing from the plurality of lines of bearing. The processor 86 may also be configured to display the target location on the user interface 82. The processor 86 may optionally be configured to selectably store protectable data transmitted by the target wireless device on the at least one data storage 90.

Figure 4A:
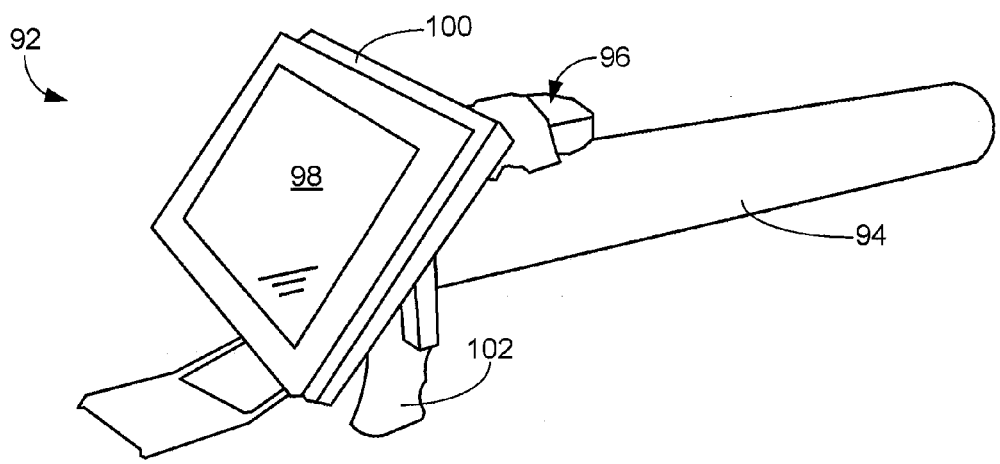
FIGS. 4A, 4B, and 5 schematically illustrate separate embodiments of an apparatus for locating a target wireless device.
Figure 4B:
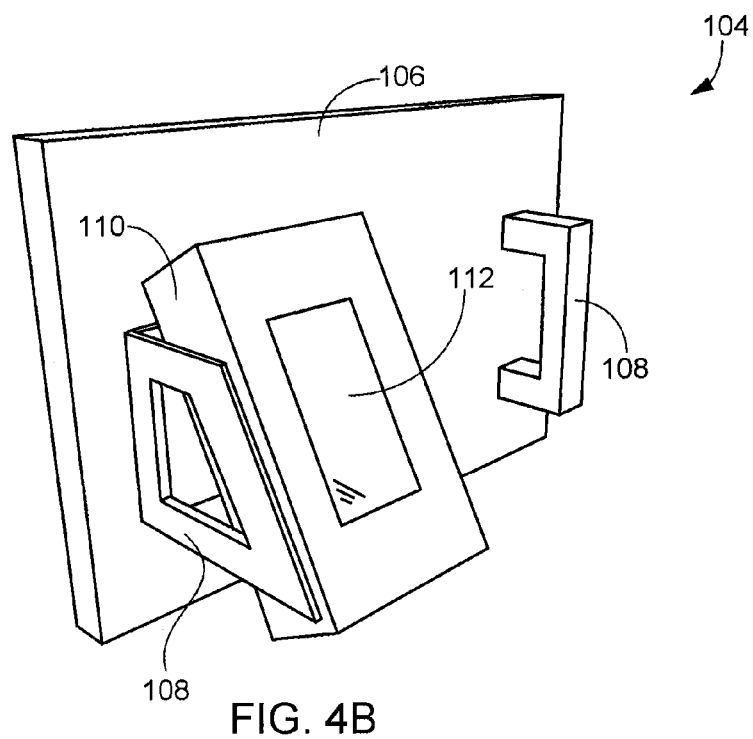
Figure 5:
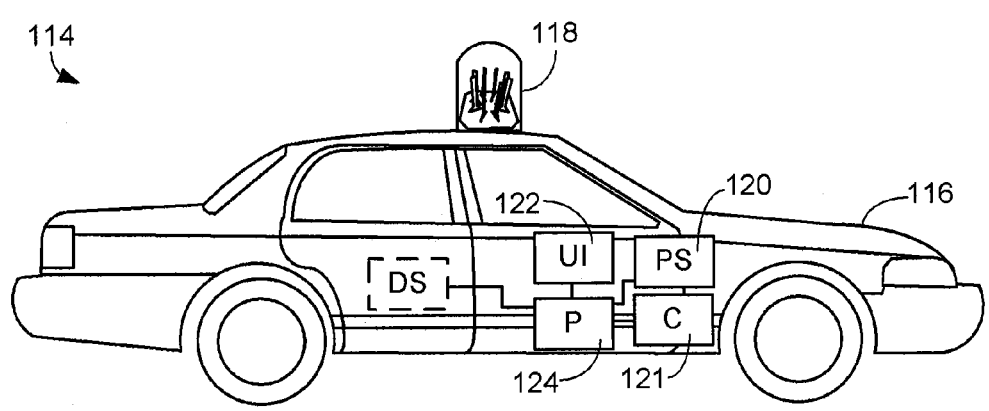

FIGS. 4A, 4B, and 5 schematically illustrate separate embodiments of an apparatus for locating a target wireless device to demonstrate some of the configurations and applications possible. The location device 92 illustrated in FIG. 4A is an example of a portable, manually sweepable device. A directional antenna 94, a positioning system and compass 96, a user interface 98, and a processor 100 are all coupled to a handgrip 102 for portable hand-held operation. In this embodiment, the directional antenna 94 can be manually swept through a field of view by an operator holding the handgrip 102 while interacting with the user interface 98 at a plurality of sensing locations to determine the target location of a target wireless device as described above. A suitable non-limiting example of a directional antenna which may be used is a 2.4 GHz 15 dBi Radome enclosed Yagi antenna manufactured by Hyperlink Technologies part number HG2415Y. A suitable non-limiting example of a positioning system which may be used is a Garmin eTrex Summit GPS. A suitable non-limiting example of a compass which may be used is a Honeywell HMR3500 electronic compass.

The location device 104 illustrated in FIG. 4B is another example of a portable, manually sweepable device. A directional antenna 106 is equipped with handles 108 for holding and sweeping the device. A positioning system, compass, and a processor may be located in a housing 110 which can be coupled to the directional antenna 106 and/or one or more of the handles 108. The housing 110 also presents a user interface 112. In this embodiment, the directional antenna 106 can be manually swept through a field of view by an operator holding the handles 108 while interacting with the user interface 112 at a plurality of sensing locations to determine the target location of a target wireless device as described above.

The location device 114 illustrated in FIG. 5 has been mounted in a vehicle 116 for portability. A dynamically beam steerable directional antenna 118 is mounted on the vehicle 116. Since the directional antenna 118 does not need to be manually swept, measurements are preferably made from a sensing location where the vehicle is stopped. The directional antenna 118, a positioning system 120, a compass 121, a user interface 122, and a processor 124 may all be coupled inside the vehicle 116 for the driver or a passenger in the vehicle 116 to operate. Although schematically the compass 121 is shown as a separate component from the directional antenna, the compass 121 may be integrated with the directional antenna. In this embodiment, the directional antenna 118 can be dynamically swept through a field of view by an operator inside of the vehicle 116 while interacting with the user interface 122 at a plurality of sensing locations to determine the target location of a target wireless device as described above.

Figure 6:
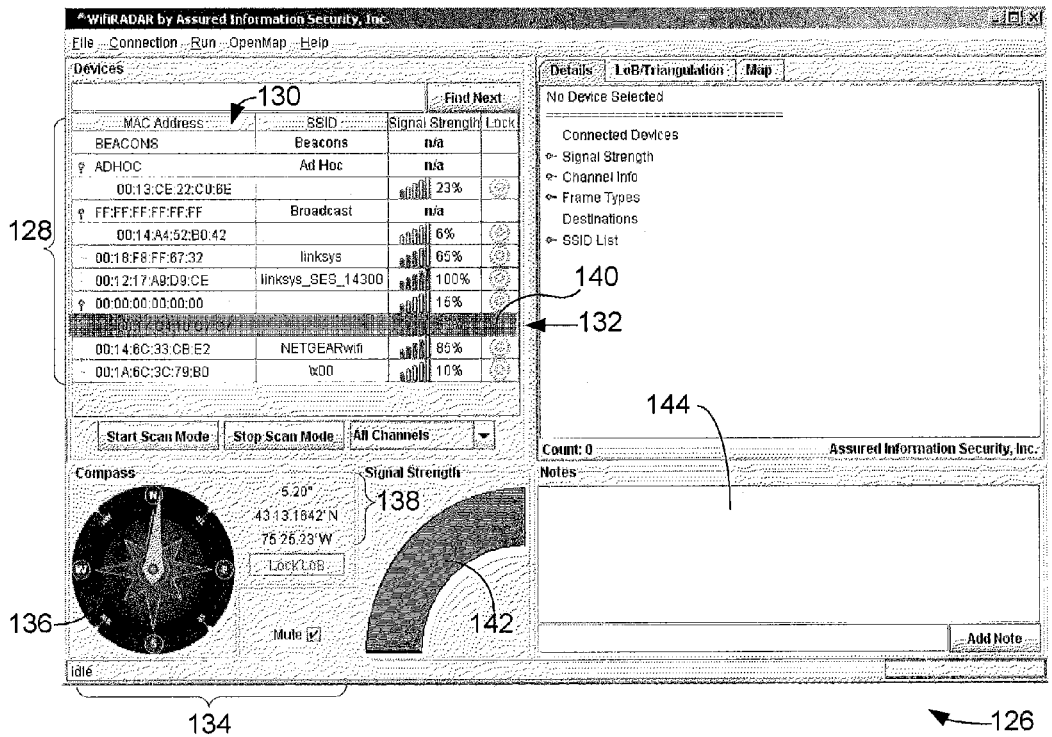
FIG. 6 illustrates one embodiment of a graphical user interface for use on an apparatus for locating a target wireless device.

FIG. 6 illustrates one embodiment of a graphical user interface (GUI) 126 for use on an apparatus for locating a target wireless device. The GUI 126 has a device list 128 which is configured to display information identifying one or more wireless devices. The device list 128 may be populated during a preliminary sweep of the directional antenna or with an optional omnidirectional antenna as described above. It should also be noted that some antennas, for example, some beam steerable antennas, may be switched between a directional mode and an omnidirectional mode to facilitate such a preliminary sweep to populate the device list 128, depending on the embodiment. The preliminary sweep or scan which populates the device list 128 may be set to scan all channels, a single channel, or a combination or sequence of channels. The device list 128 may show a unique identifier 130, such as a MAC address, for any wireless devices in the device list. Service Set Identifier (SSID), Basic Service Set Identifier (BSSID), and signal strength are just a few examples of some of the additional information which may be displayed for each detected wireless device. A target wireless device may be flagged 132 by highlighting the device manually or automatically based on a list of target wireless devices to watch out for.

The GUI 126 also includes bearing information 134 for the directional antenna. A graphic compass 136 may be provided in addition to numeric bearing information 138 showing bearing and current position. The GUI 126 also has a lock control 140 configured to select one of the one or more identified wireless devices as the target wireless device for location and to initiate the determination of one or more lines of bearing toward the target wireless device. The GUI 126 may also have a feedback mechanism such as a signal strength indicator 142 as discussed above for use in sweeping the directional antenna. The GUI 126 may optionally have a notation input device 144 for storing notes on activities, the target wireless device, field observations, etc.

Figure 7:
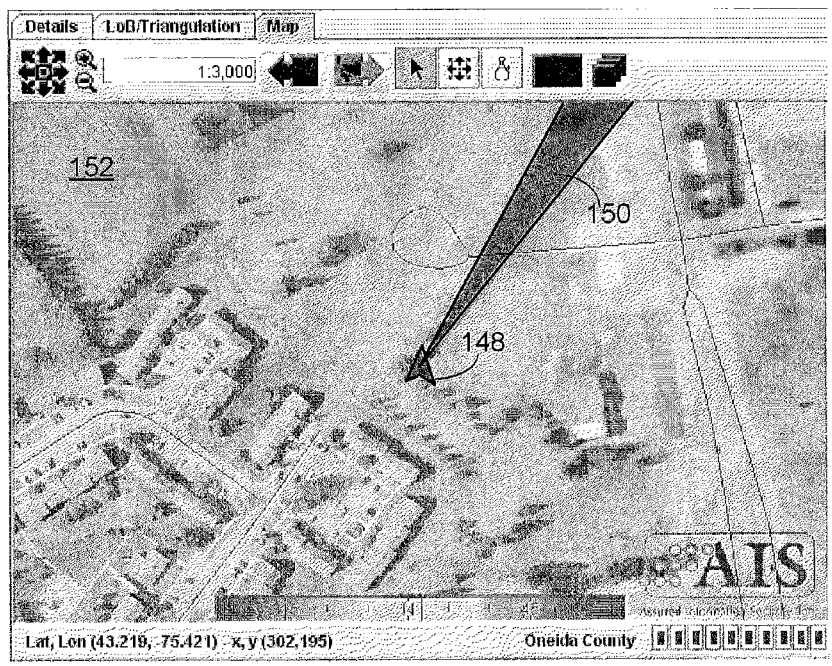
FIG. 7 illustrates another embodiment of a graphical user interface for use on an apparatus for locating a target wireless device, wherein a current position and a line of bearing are illustrated.

FIG. 7 illustrates another embodiment of a graphical user interface (GUI) 146 for use on an apparatus for locating a target wireless device, wherein a current position 148 and a line of bearing 150 to the target wireless device are illustrated. Depending on the embodiment, the line of bearing may be displayed as an actual line or as a slice (as illustrated), the slice recognizing the fact that the directional antenna may have a particular beam width. A current bearing of the directional antenna is also illustrated by the orientation of the arrow 148 at the current position. The current position and bearing illustrated by the arrow 148 and the line of bearing 150 are displayed on a map 152 to provide more helpful visual information to an operator. The GUI 146 may be separately viewable from GUI 126 or may be displayed simultaneously with some or all of the GUI 126 elements.

Figure 8:
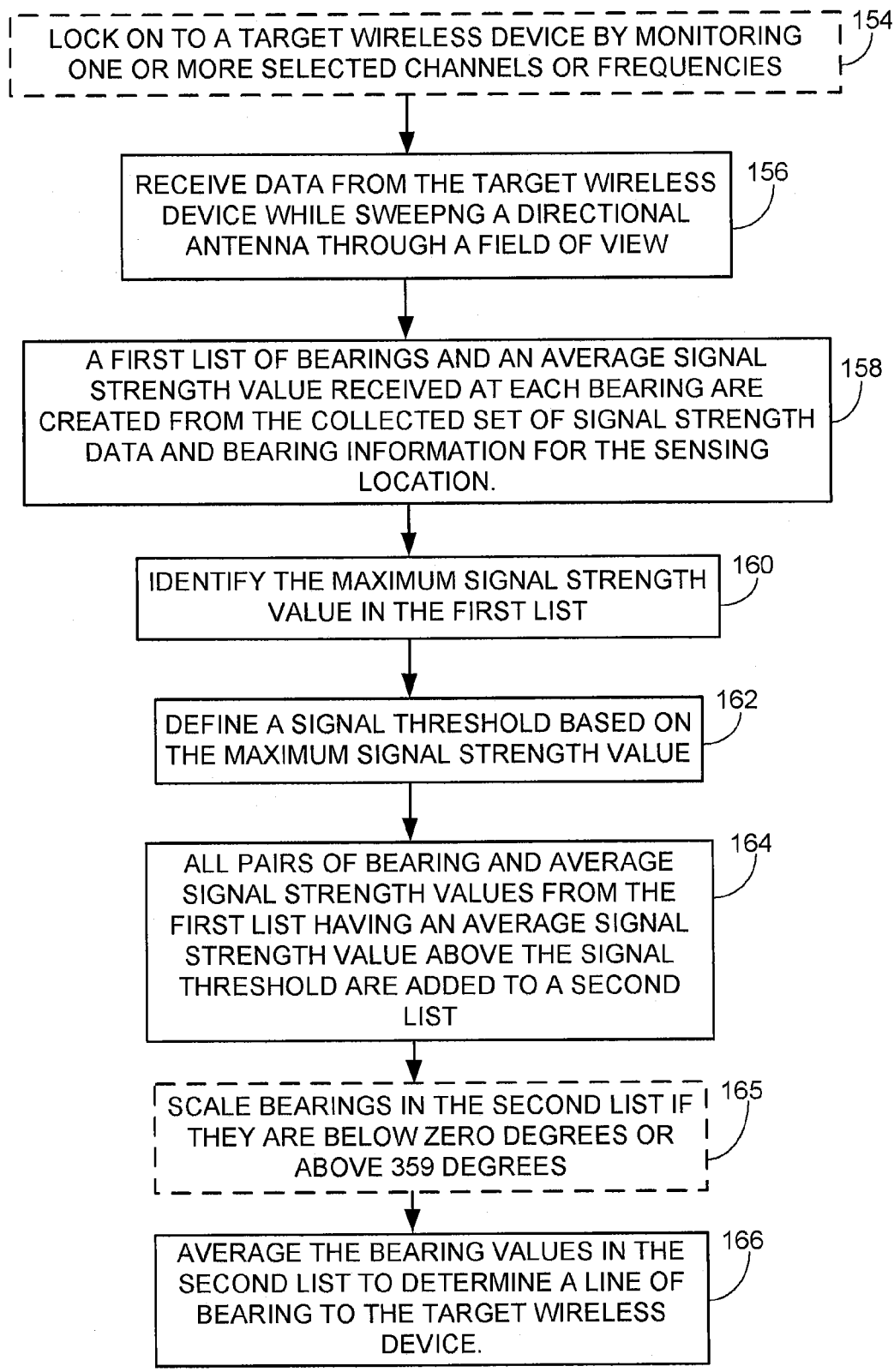
FIG. 8 illustrates one embodiment of a method for determining a line of bearing from a sensing location based on a collected set of signal strength data and bearing information from the sensing location.

The line of bearing may be determined from each sensing location based on the collected set of signal strength data and bearing information for each sensing location. FIG. 8 illustrates one such embodiment of a method for determining a line of bearing from a sensing location based on a collected set of signal strength data and bearing information. As a recap, a target wireless device may optionally be locked-onto 154 by monitoring one or more selected channels or frequencies. In some situations it may not be necessary to lock onto the target wireless device because the target wireless device is the only device known to be present in an area or the target wireless device may already be known to be communicating on a set frequency. As already described, data is received 156 from the target wireless device while sweeping a directional antenna through a field of view. A first list of bearings and an average signal strength value received at each bearing are created 158 from the collected set of signal strength data and bearing information for the sensing location. A maximum signal strength value is identified 160 in the first list. A signal threshold is defined 162 based on the maximum signal strength value. As one example, the signal threshold may be defined based on the maximum signal strength value as:

$$T_S = S_{max} - [(S_{max} - S_{min})T_F]$$

where $T_S$ is the signal threshold, $S_{max}$ is the maximum signal strength, $S_{min}$ is the minimum signal strength, and $T_F$ is a threshold factor. The threshold factor is preferably empirically determined with minimal experimentation with a location apparatus. Empirically, a threshold factor of approximately 0.20 has been shown to be effective, but other factors may be used as well. An effective threshold factor can depend in part on the selectivity of the antenna. Whether or not there are multiple signal paths from the target to antenna can also affect a suitable empirical threshold factor. One way to arrive at a suitable threshold factor is by replaying multiple field test datasets through the line of bearing determination process and finding an empirical threshold value which results in the least error from the actual line of bearing. All pairs of bearing and average signal strength values from the first list having an average signal strength value above the signal threshold are added 164 to a second list. Optionally, the bearings in the second list may be scaled 165 if the bearing values are below 0° or beyond 359° to allow more accurate averaging of the bearing values in the second list that may occur near upper and lower limits of the compass. Such scaling would account for the case of the maximum signal value measurements occurring at headings near 0° and 359°. If this scaling is not done, averaging would tend to pull line of bearing measurements from near the compass limits toward the median value, rather than towards the actual line of bearing. The bearing values in the second list are then averaged 166 to determine a line of bearing to the target wireless device.

As a further alternative, a line of bearing from a sensing location may be determined based on a collected set of signal strength data and bearing information by taking the derivative of the signal strength with respect to the angular bearing. In such an embodiment, when the derivative of the signal strength with respect to angular bearing changes sign, the corresponding bearing could be locked-onto to determine the line of bearing from the sensing location to the target wireless device.

Figure 9:
FIG. 9 schematically illustrates another embodiment of a graphical user interface for use on an apparatus for locating a target wireless device, wherein a log of information pertaining to the location of the target wireless device is displayed.

FIG. 9 schematically illustrates another embodiment of a graphical user interface (GUI) 168 for use on an apparatus for locating a target wireless device, wherein a log of information 170 pertaining to the location of the target wireless device is displayed. The log may include information on system initialization, a list of unique identifiers being monitored, a list of channels being scanned, an indication of a target wireless device which has been locked onto, one or more captured screen shots showing positions and one or more lines of bearing, notes entered by a user, line of bearing information, as well as time stamps corresponding to various events.

Figure 10:
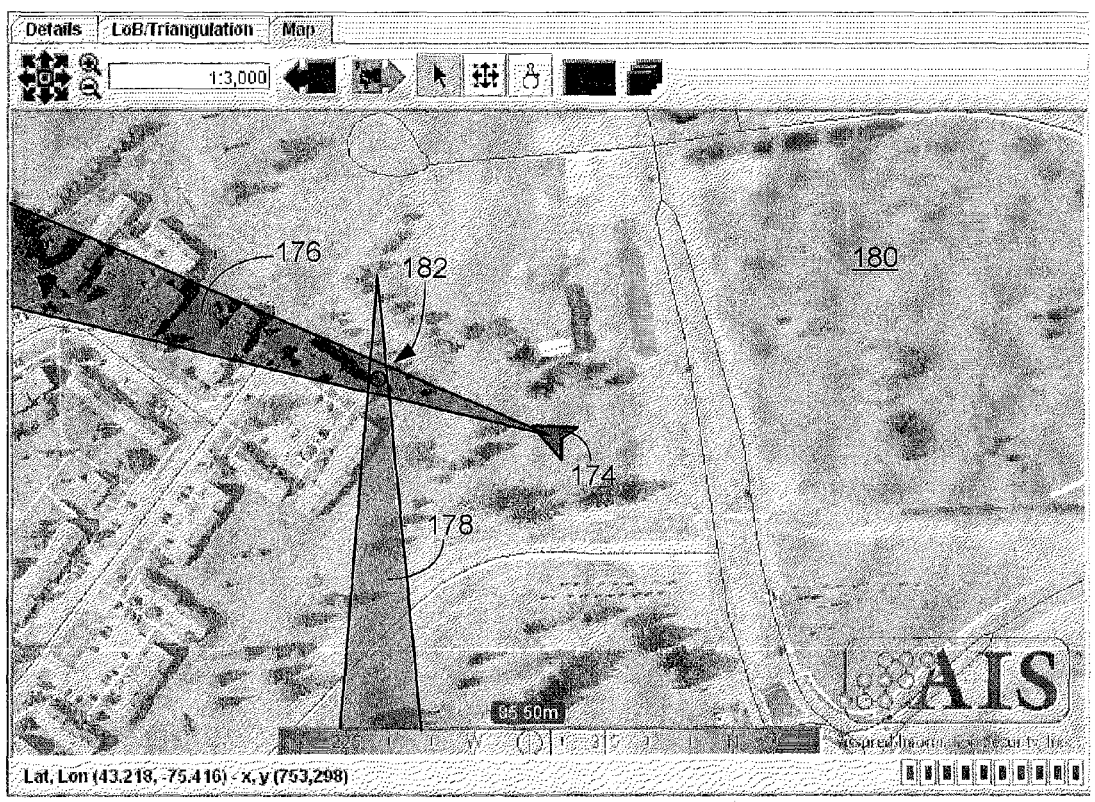
FIG. 10 illustrates another embodiment of a graphical user interface for use on an apparatus for locating a target wireless device, wherein a current position and two lines of bearing are illustrated.

FIG. 10 illustrates another embodiment of a graphical user interface (GUI) 172 for use on an apparatus for locating a target wireless device, wherein a current position and bearing 174 and two lines of bearing 176, 178 to a target wireless device are illustrated on a map 180. The two lines of bearing 176 and 178 were taken from different positions, and the lines of bearing 176, 178 intersect at location 182. The intersection 182 may be highlighted as discussed previously. The lines of bearing 176 could have been gathered by the same location apparatus moved around or by more than one location apparatus. Furthermore, if more than one location apparatus is moved around, one or more of those location apparatuses can be fixed location devices or portable devices.

Figure 11:
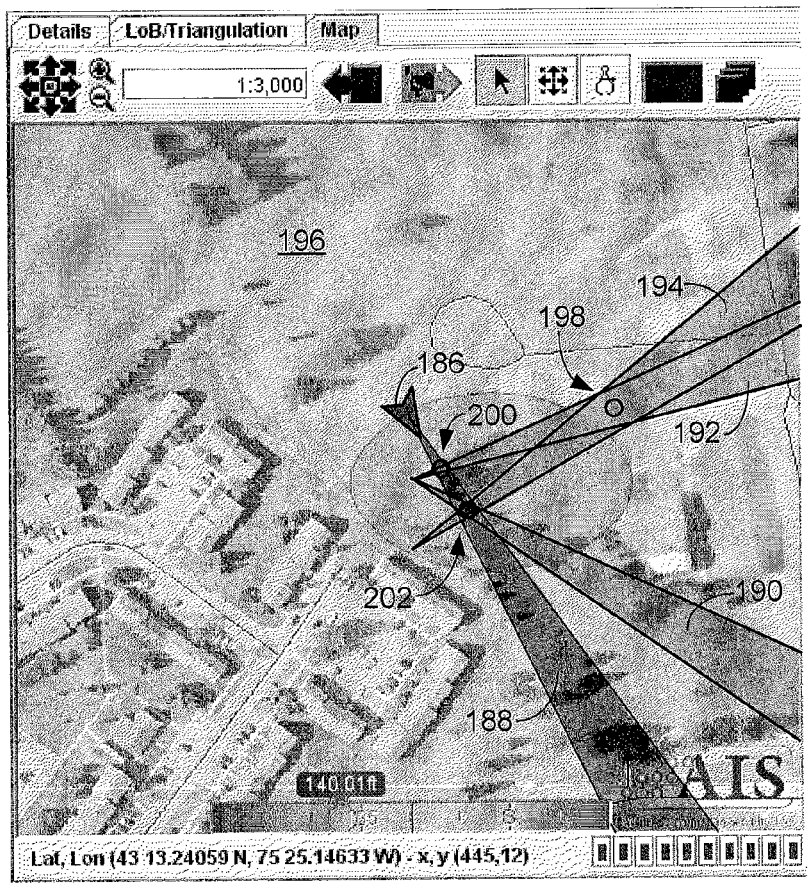
FIG. 11 illustrates another embodiment of a graphical user interface for use on an apparatus for locating a target wireless device, wherein a current position and four lines of bearing are illustrated.
Figure 12:
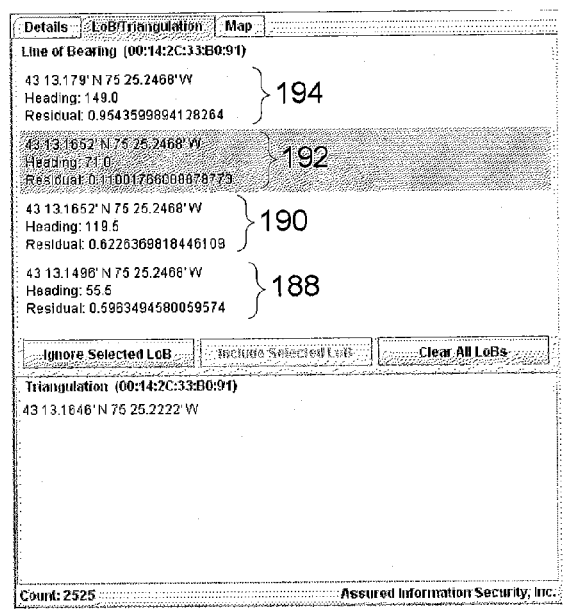
FIG. 12 illustrates another embodiment of a graphical user interface for use on an apparatus for locating a target wireless device, wherein information pertaining to one or more lines of bearing may be displayed, selected, and/or cleared.
Figure 13:
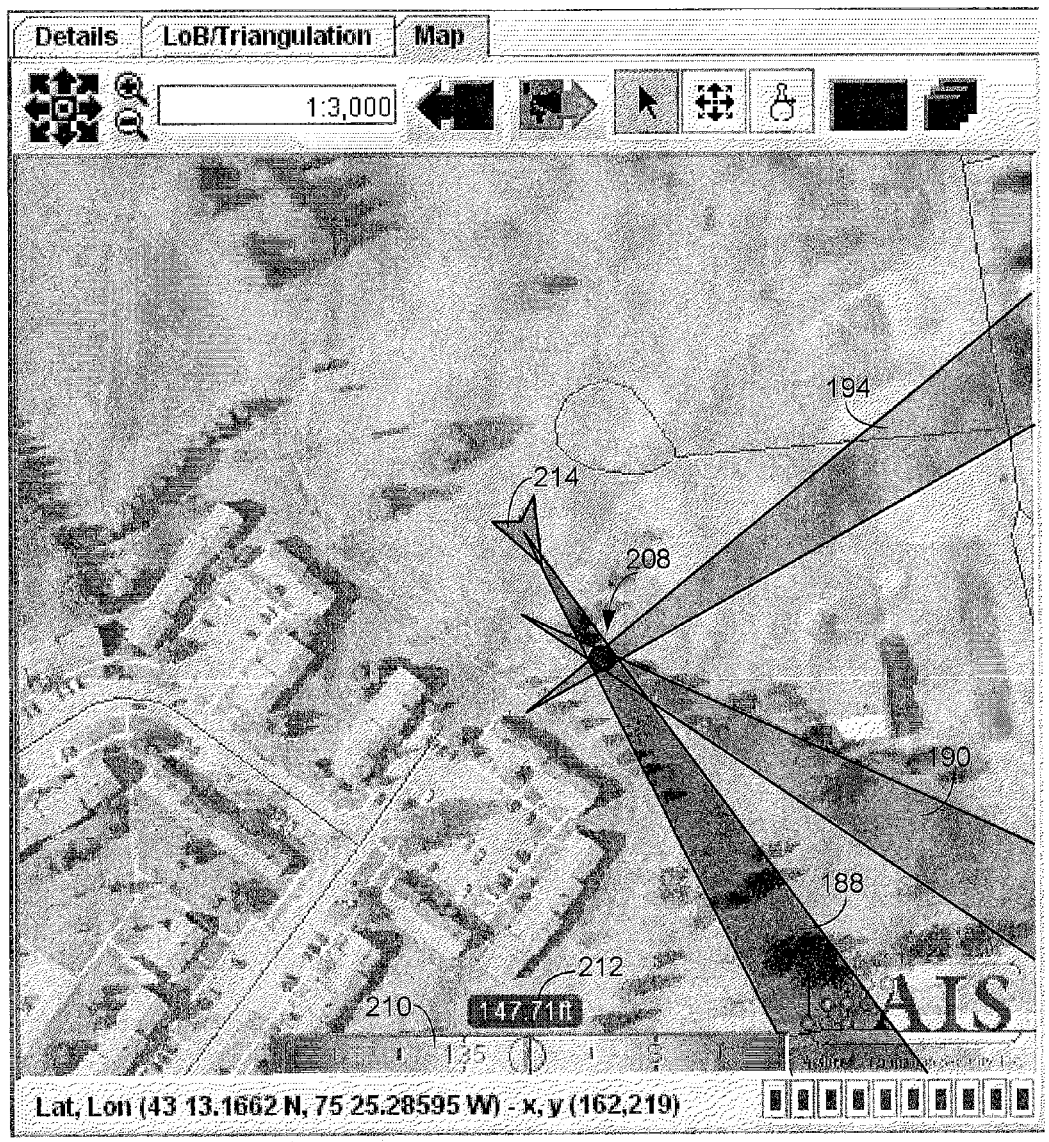
FIG. 13 illustrates another embodiment of a graphical user interface for use on an apparatus for locating a target wireless device, wherein a current position and three of the four lines of bearing from FIG. 10 are illustrated.

Although only two lines of bearing are needed to produce an intersection for locating a target wireless device, location accuracy may be increased by gathering more lines of bearing. FIG. 11 illustrates another embodiment of a graphical user interface (GUI) 184 for use on an apparatus for locating a target wireless device, wherein a current bearing and position 186 and four lines of bearing 188, 190, 192, 194 are illustrated on a map 196. In the illustrated scenario, while trying to locate a target wireless device, the four lines of bearing 188-194 intersect in three possible places 198, 200, 202. In this situation, one or more of the lines of bearing 188-194 may be removed from the location determination if it is thought to be an erroneous line of bearing. The suspected line of bearing could be selected from the GUI 184 or from an additional GUI 204 such as the one illustrated in FIG. 12. FIG. 12 illustrates another embodiment of a graphical user interface (GUI) 204 for use on an apparatus for locating a target wireless device, wherein information pertaining to one or more lines of bearing 188-194 may be displayed, selected, and/or cleared. In this example, line of bearing 192 is selected to be ignored in the location determination. The result is illustrated in the GUI 206 of FIG. 13 where a clear location of the target wireless device is indicated by the intersection 208 of the three remaining lines of bearing 188, 190, and 194. The GUI 206 may also be equipped with a direction indicator 210 and a distance indicator 212 from the current position 214 to the target wireless device to assist an operator with navigating to the target wireless device.

Figure 14A:
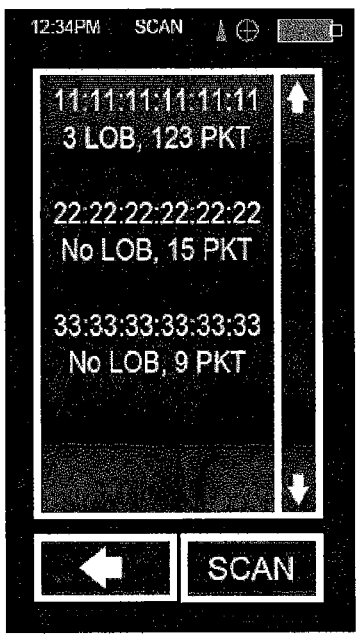
FIGS. 14A-14D illustrate further embodiments of a graphical user interface for use on an apparatus for locating a target wireless device.
Figure 14B:
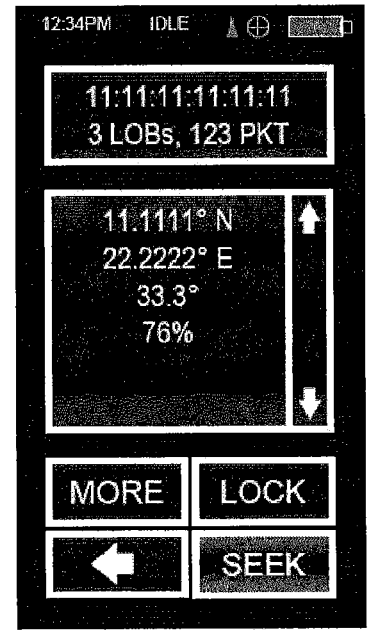
Figure 14C:
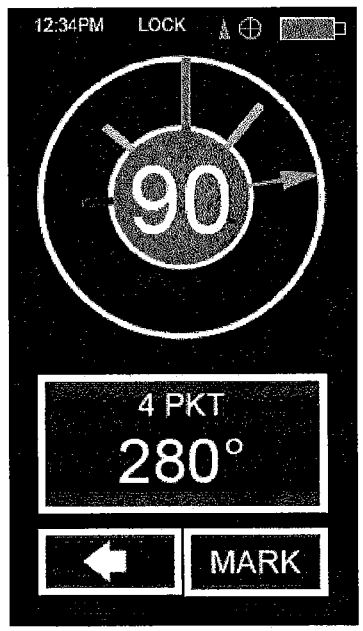
Figure 14D:
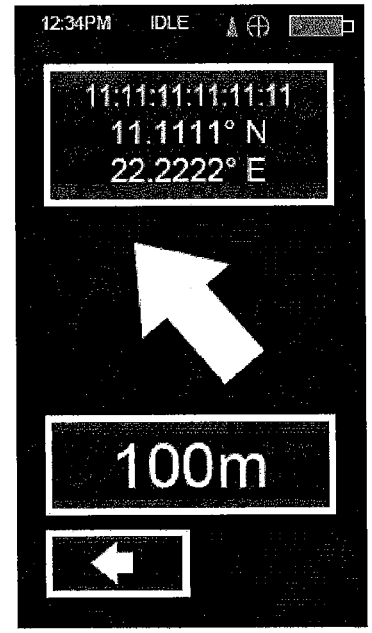

FIGS. 14A-14D illustrate further embodiments of a graphical user interface for use on an apparatus for locating a target wireless device. The graphical user interface of FIG. 14A illustrates an embodiment of a device list configured to display information identifying one or more wireless devices. The graphical user interface of FIG. 14B illustrates an embodiment of bearing information for a directional antenna. The graphical user interface of FIG. 14B also is able to use the up and down arrows to select one or more of the identified wireless devices from FIG. 14A as the target wireless device and has a lock control configured to be used with the selected target wireless device in order to initiate the determination of one or more lines of bearing towards the target wireless device. The graphical user interface of FIG. 14C illustrates an embodiment of a graphical user interface in a lock mode initiated by the lock control of FIG. 14B. In FIG. 14C, the lines without an arrow in the center circle indicate signal strength readings and the angle in which they were received. The arrow in the circle indicates which direction is north. The "4PKT" is the number of frames that have been collected for the Line of Bearing algorithm. The "Mark" button sets the line of bearing of a current position. The graphical user interface of FIG. 14D illustrates an embodiment of a coordinate display configured to show a location of the target wireless device as determined from a plurality of the one or more lines of bearing. Furthermore, the graphical user interface of FIG.

14D has a direction indicator configured to show the direction from a current position to the target wireless device and a distance indicator configured to show a distance from the current position to the target wireless device.

Figure 15:
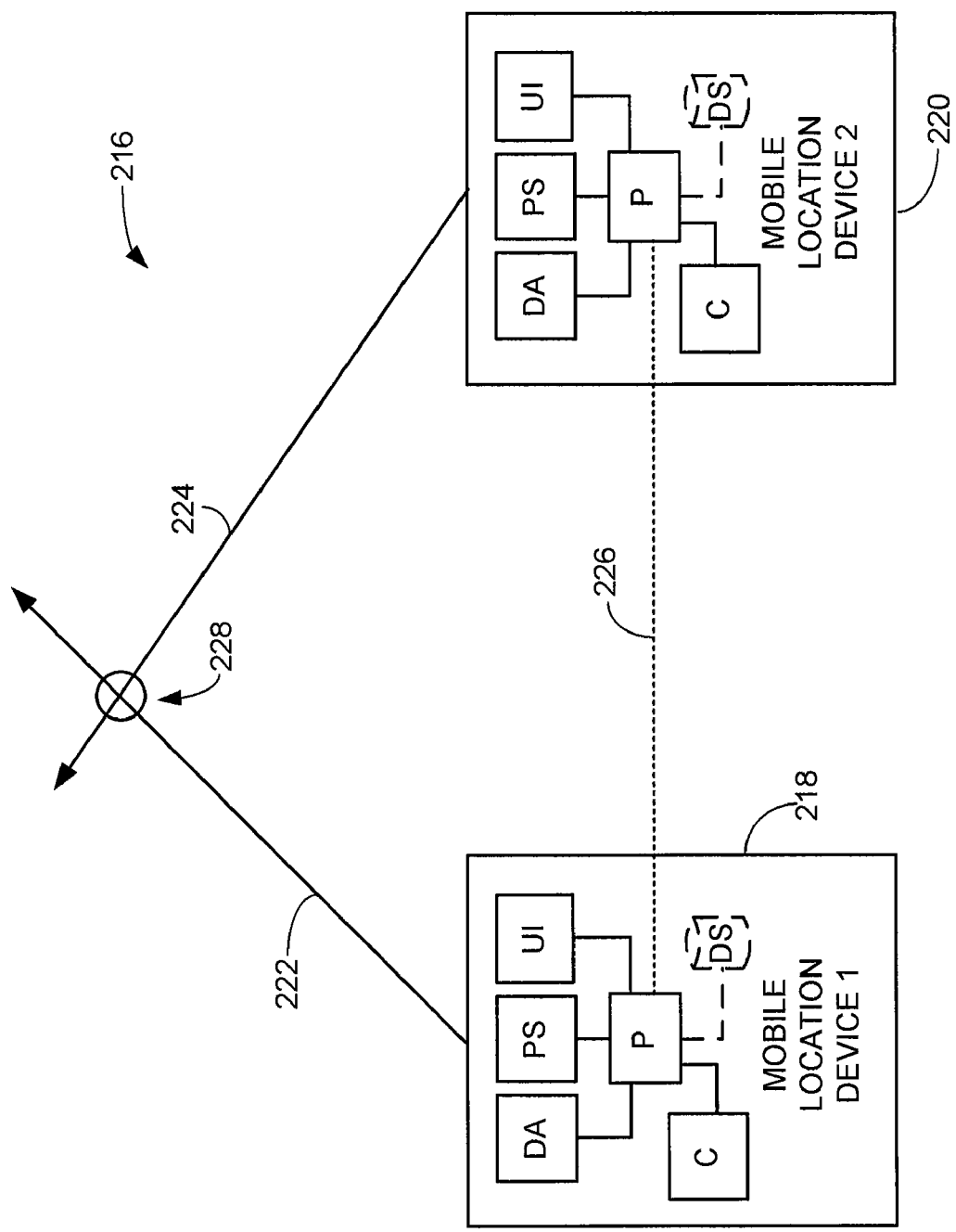
FIGS. 15-20 illustrate different embodiments of a system for locating a target wireless device.

FIG. 15 schematically illustrates one embodiment of a system 216 for locating a target wireless device. The system 216 has a first mobile location device 218 and a second mobile location device 220. Each mobile location device 218, 220 has a processor (P), a directional antenna (DA), a positioning system (PS), a compass (C), a user interface (UI), and an optional data storage (DS), the features of which have been discussed above. The first and second mobile location devices 218, 220 may be moved into desired, but separate sensing locations where a first line of bearing 222 may be determined by the first mobile location device 218 and a second line of bearing 224 may be determined by the second mobile location device 220 using the methods described above or their equivalents. In the location system 216, the first mobile location device 218 and the second mobile location device 220 are coupled 226 so that the first and second lines of bearing 222, 224 may be shared to determine an intersection 228 where the target wireless device is located. Although only two location devices have been illustrated in this example for simplicity, it should be noted that other systems may have more than two location devices.

Figure 16:
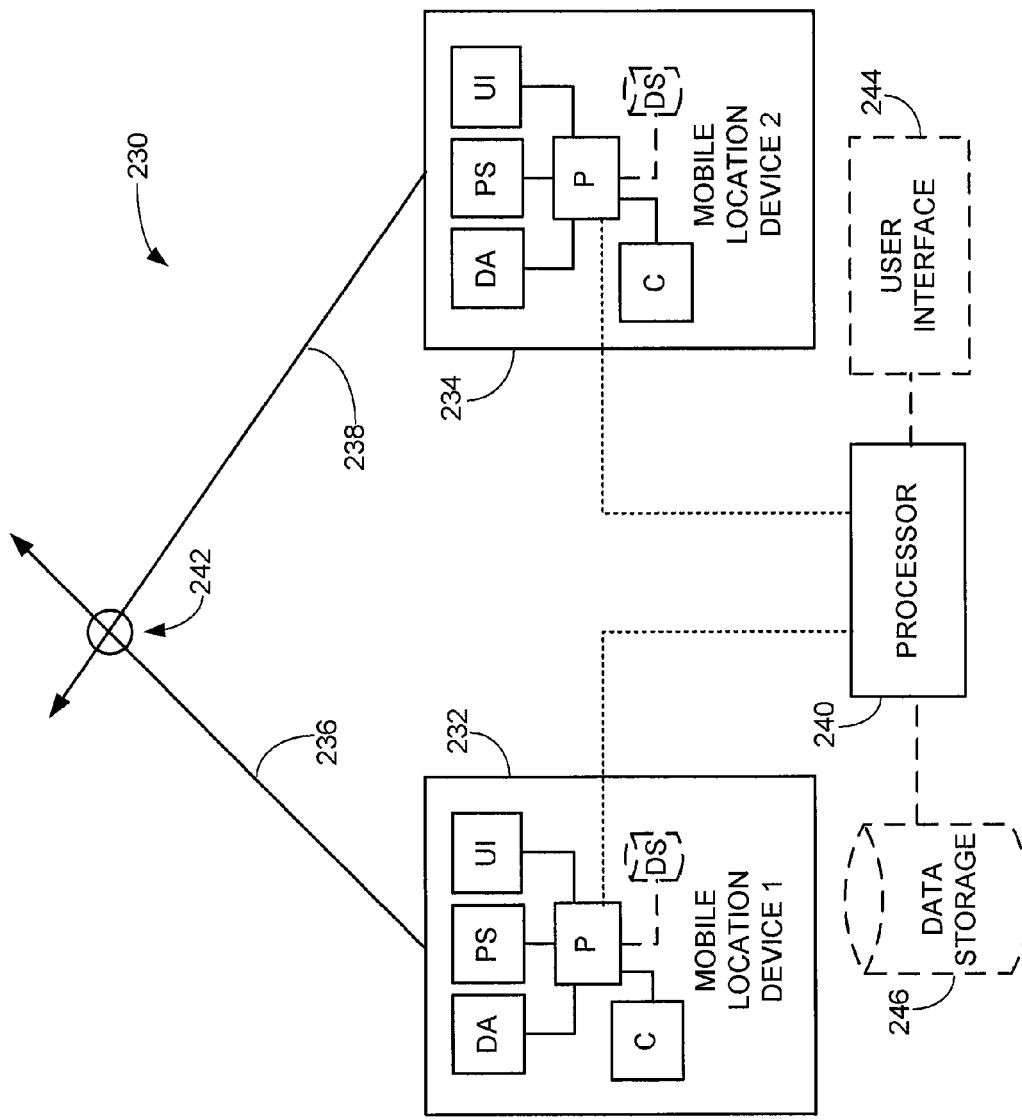

FIG. 16 schematically illustrates another embodiment of a system 230 for locating a target wireless device. The system 230 has a first mobile location device 232 and a second mobile location device 234. Each mobile location device 232, 234 has a processor (P), a directional antenna (DA), a positioning system (PS), a compass (C), a user interface (UI), and an optional data storage (DS), the features of which have been discussed above. The first and second mobile location devices 232, 234 may be moved into desired, but separate sensing locations where a first line of bearing 236 may be determined by the first mobile location device 232 and a second line of bearing 238 may be determined by the second mobile location device 234 using the methods described above or their equivalents. In the location system 230, the first mobile location device 232 and the second mobile location device 234 are coupled by a remote processor 240 so that the first and second lines of bearing 236, 238 may be shared to determine an intersection 242 where the target wireless device is located. The processors (P) of the first and second mobile location devices 232, 234 may or may not be capable of determining the intersection 242 of the lines of bearing from other location devices, however, the remote processor 240 may be configured to handle this determination. In this situation, the intersection 242 information may be passed back to one or more of the mobile location devices 232 and or displayed on an optional user interface 244 coupled to the remote processor 240. Furthermore, an optional data storage 246 may be coupled to the processor 240 for storage of information collected during the location process. Although only two location devices have been illustrated in this example for simplicity, it should be noted that other systems may have more than two location devices.

Figure 17:
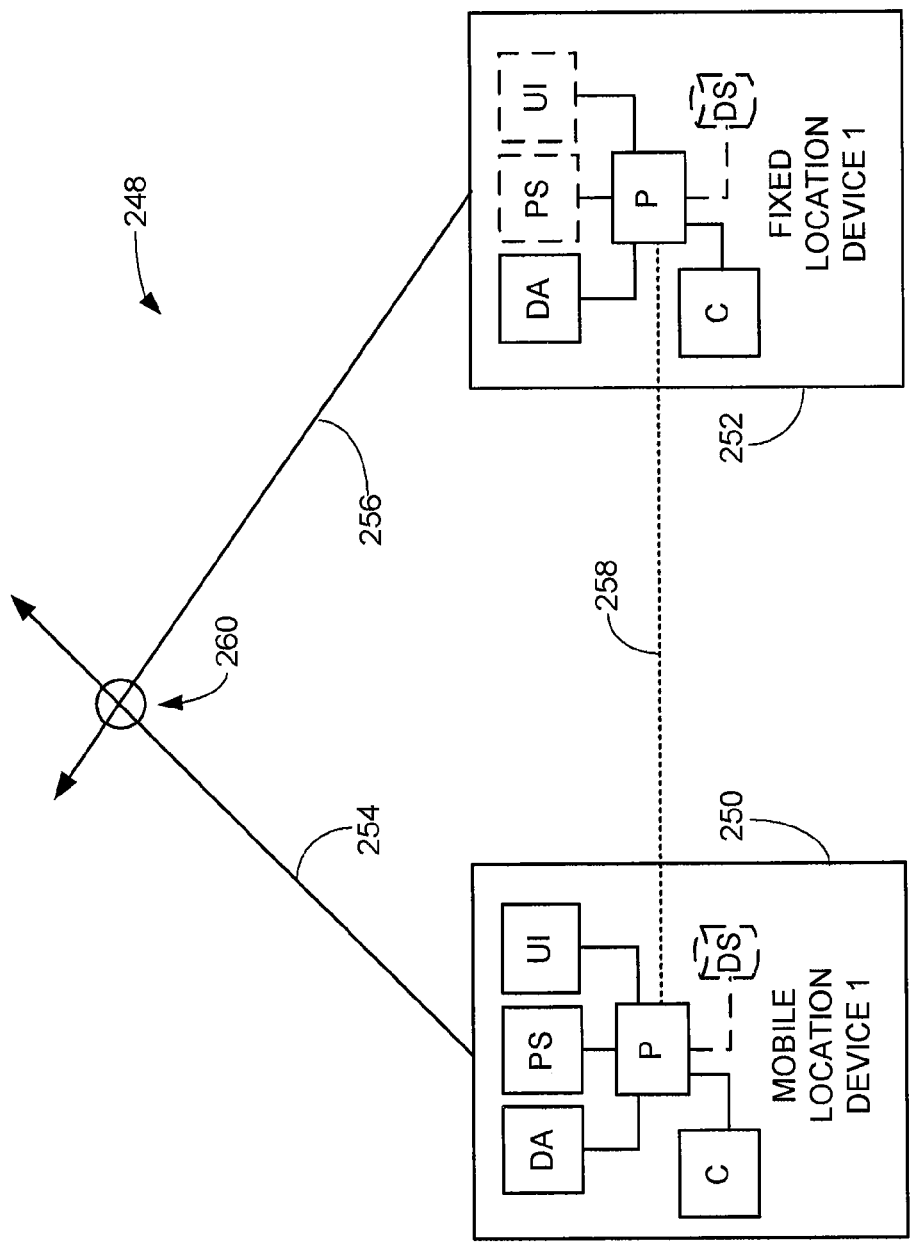

FIG. 17 schematically illustrates one embodiment of a system 248 for locating a target wireless device. The system 248 has a first mobile location device 250 and a first fixed location device 252. The first mobile location device 250 has a processor (P), a directional antenna (DA), a positioning system (PS), a compass (C), a user interface (UI), and an optional data storage (DS), the features of which have been discussed above. The first fixed location device 252 has a compass (C) and a directional antenna (DA) which can be manually adjusted to aim in a single direction, or dynamically beam-swept through a field of view, or electromechanically swept through a field of view. The first fixed location device 252 has an optional positioning system (PS), since the position of the first fixed location device may already be known by the first mobile location device 250. Alternatively, the first fixed location device 252 may have a positioning system (PS) which either functions as described in previous embodiments or one which is simply an internally settable location programmed as part of an installation or calibration of the first fixed location device 252. The first fixed location device 252 may have an optional user interface (UI), but does not need one, since an operator is not necessarily needed at the fixed location. The first fixed location device 252 may also have an optional data storage (DS), the features of which have been discussed above. The first mobile location devices 250 may be moved into desired location separate from the location of the first fixed location device 252. A first line of bearing 254 may be determined by the first mobile location device 250 and a second line of bearing 256 may be determined by the first fixed location device 252 using the methods described above or their equivalents. In the location system 248, the first mobile location device 250 and the fixed mobile location device 252 are coupled 258 so that the first and second lines of bearing 254, 256 may be shared to determine an intersection 260 where the target wireless device is located. Although only two location devices have been illustrated in this example for simplicity, it should be noted that other systems may have more than two location devices.

Figure 18:
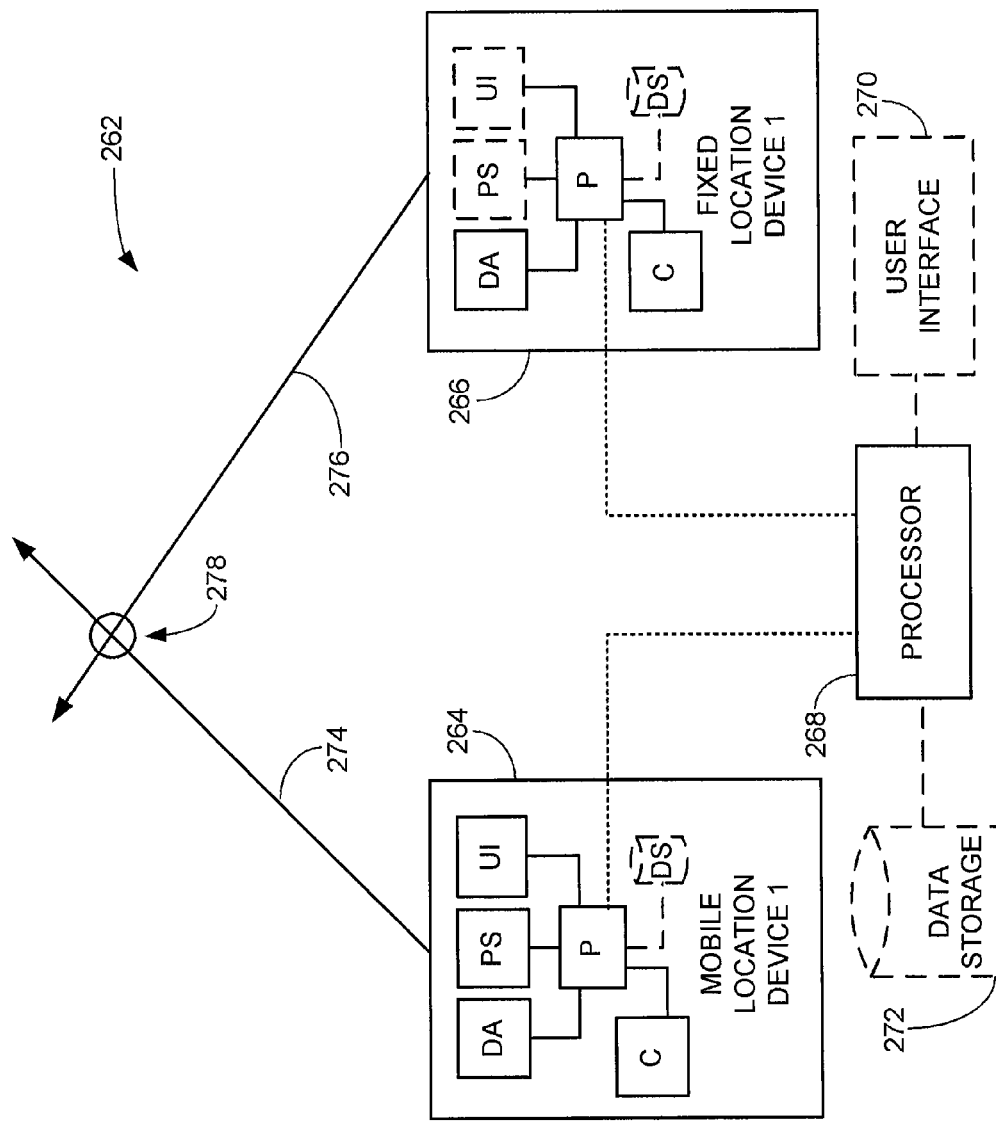

FIG. 18 schematically illustrates one embodiment of a system 262 for locating a target wireless device. The system 262 has a first mobile location device 264 and a first fixed location device 266. The first mobile location device 262 has a processor (P), a directional antenna (DA), a positioning system (PS), a compass (C), a user interface (UI), and an optional data storage (DS), the features of which have been discussed above. The first fixed location device 266 has a compass (C) and a directional antenna (DA) which can be manually adjusted to aim in a single direction, or dynamically beam-swept through a field of view, or electromechanically swept through a field of view. The first fixed location device 266 has an optional positioning system (PS), since the position of the first fixed location device may already be known by the first mobile location device 264 or a remote processor 268 which couples the first mobile location device 264 and the first fixed location device 266 together. As described above, the remote processor 268 may have an optional user interface 270 and/or a data storage 272. Alternatively, the first fixed location device 266 may have a positioning system (PS) which either functions as described in previous embodiments or one which is simply an internally settable location programmed as part of an installation or calibration of the first fixed location device 266. The first fixed location device 266 may have an optional user interface (UI), but does not need one, since an operator is not necessarily needed at the fixed location. The first fixed location device 266 may also have an optional data storage (DS), the features of which have been discussed above. The first mobile location devices 264 may be moved into desired location separate from the location of the first fixed location device 266. A first line of bearing 274 may be determined by the first mobile location device 264 and a second line of bearing 276 may be determined by the first fixed location device 266 using the methods described above or their equivalents. In the location system 262, the first mobile location device 264 and the first fixed location device 266 are coupled by the remote processor 268 so that the first and second lines of bearing 274, 276 may be shared to determine an intersection 278 where the target wireless device is located. The processors (P) of the first mobile location device 264 and the first fixed location device 266 may or may not be capable of determining the intersection 278 of the lines of bearing from other location devices, however, the remote processor 268 may be configured to handle this determination. In this situation, the intersection 278 information may be passed back to the first mobile location device 264 and/or the first fixed location device 266. Additionally, the intersection 278 information may be displayed on the optional user interface 272 coupled to the remote processor 268. Although only two location devices have been illustrated in this example for simplicity, it should be noted that other systems may have more than two location devices.

Figure 19:
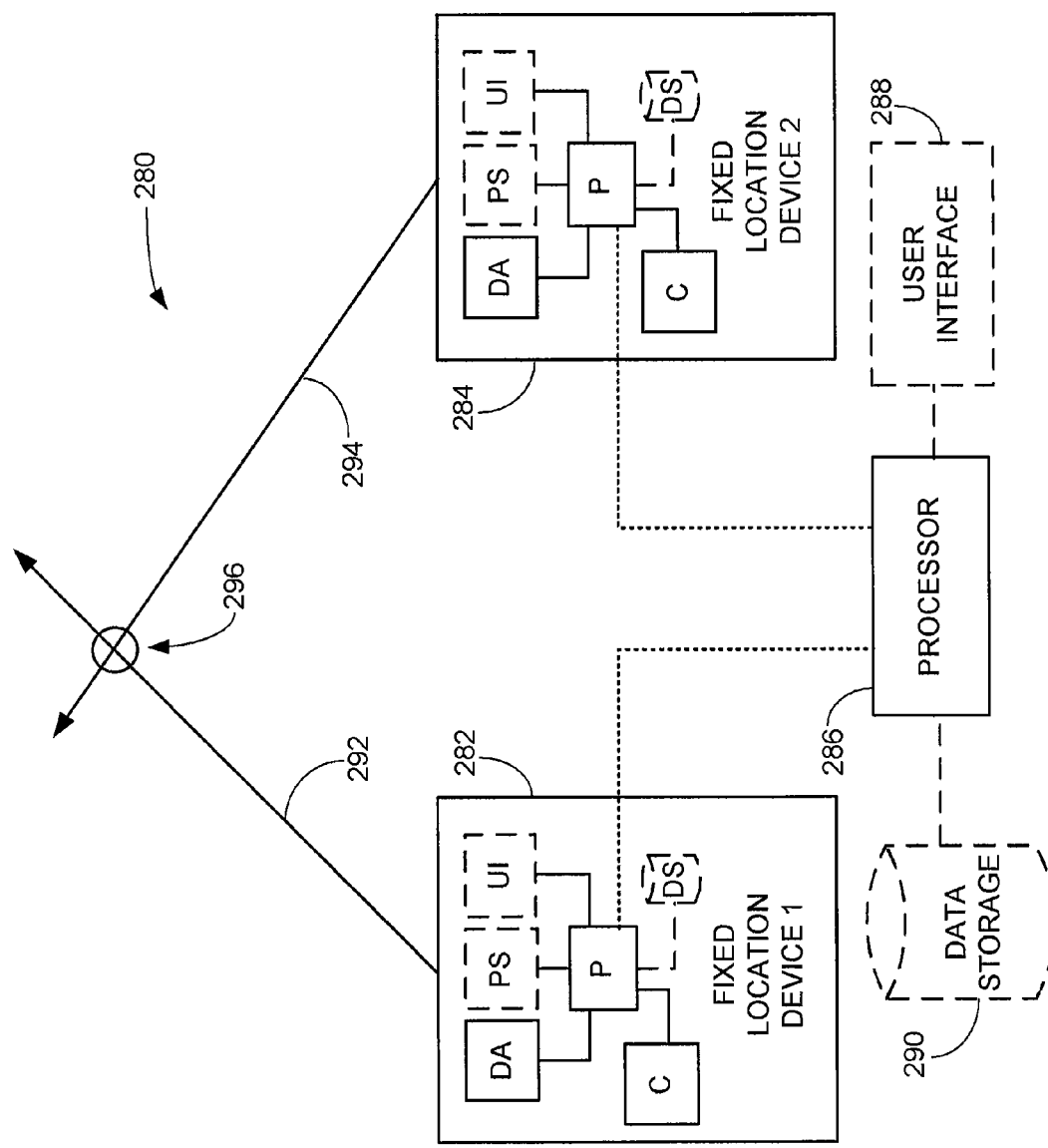

FIG. 19 schematically illustrates one embodiment of a system 280 for locating a target wireless device. The system 280 has a first fixed location device 282 and a second fixed location device 284. The first and second fixed location devices 282, 284 have a processor (P), a compass (C), and a directional antenna (DA) which can be manually adjusted to aim in a single direction, or dynamically beam-swept through a field of view, or electromechanically swept through a field of view. The first and second fixed location devices 282, 284 have an optional positioning system (PS), since the position of the first and second fixed location devices 282, 284 may already be known by a remote processor 286 which couples the first fixed location device 282 and the second fixed location device 284 together. As described above, the remote processor 286 may have an optional user interface 288 and/or a data storage 290. Alternatively, the first and second fixed location devices 282, 284 may have a positioning system (PS) which either functions as described in previous embodiments or one which is simply an internally settable location programmed as part of an installation or calibration of the first and second fixed location devices 282, 284. The first and second fixed location devices 282, 284 may have an optional user interface (UI), but do not need one, since an operator is not necessarily needed at the fixed locations. The first and second fixed location devices 282, 284 may also have an optional data storage (DS), the features of which have been discussed above. The first and second fixed location devices 282, 284 should be located in separate positions. A first line of bearing 292 may be determined by the first fixed location device 282 and a second line of bearing 294 may be determined by the second fixed location device 284 using the methods described above or their equivalents. In the location system 280, the first fixed location device 282 and the second fixed location device 284 are coupled by the remote processor 286 so that the first and second lines of bearing 292, 294 may be shared to determine an intersection 296 where the target wireless device is located. The processors (P) of the first and second fixed location devices 282, 284 may or may not be capable of determining the intersection 296 of the lines of bearing from other location devices, however, the remote processor 286 may be configured to handle this determination. In this situation, the intersection 296 information may be passed back to the first and/or second fixed location devices 282, 284. Additionally, the intersection 296 information may be displayed on the optional user interface 288 coupled to the remote processor 286. Although only two location devices have been illustrated in this example for simplicity, it should be noted that other systems may have more than two location devices.

Figure 20:
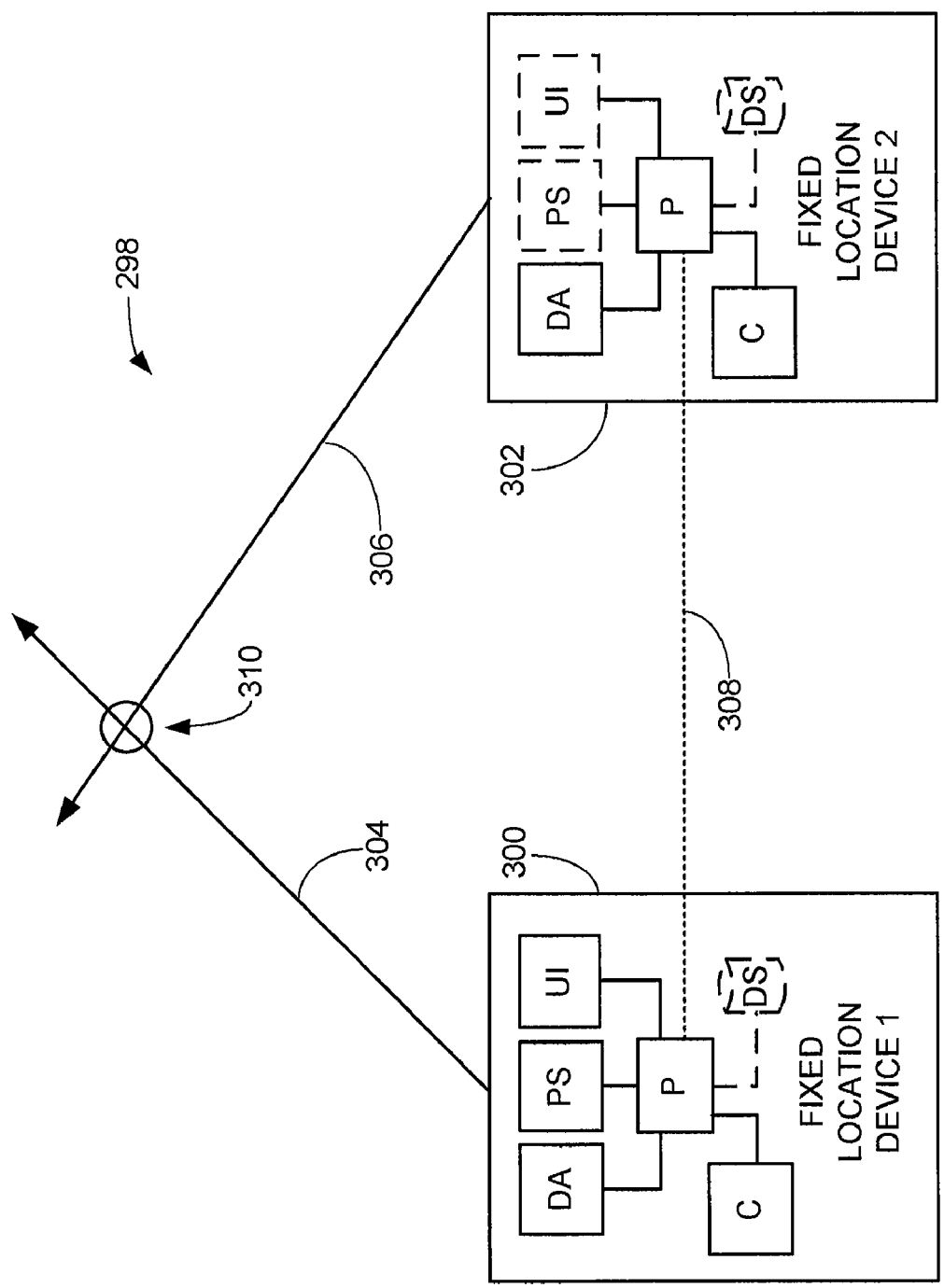

FIG. 20 schematically illustrates one embodiment of a system 298 for locating a target wireless device. The system 298 has a first fixed location device 300 and a second fixed location device 302. The first fixed location device 300 has a processor (P), a compass (C), a directional antenna (DA), a user interface (UI), and an optional data storage (DS), the features of which have been discussed above. The second fixed location device 302 has a compass (C) and a directional antenna (DA) which can be manually adjusted to aim in a single direction, or dynamically beam-swept through a field of view, or electromechanically swept through a field of view. The first and second fixed location devices 300, 302 have an optional positioning system (PS), since the position of the first and second fixed location devices 300, 302 may already be. Alternatively, the first and second fixed location devices 300, 302 may have a positioning system (PS) which is simply an internally settable location programmed as part of an installation or calibration of the first and second fixed location devices 300, 302. The second fixed location device 302 may have an optional user interface (UI), but does not need one, since an operator is not necessarily needed at each fixed location. The second fixed location device 302 may also have an optional data storage (DS), the features of which have been discussed above. The first and second fixed location devices 300, 302 are located separately from each other. A first line of bearing 304 may be determined by the first fixed location device 300 and a second line of bearing 306 may be determined by the second fixed location device 302 using the methods described above or their equivalents. In the location system 298, the first fixed location device 300 and the second fixed mobile location device 302 are coupled 308 so that the first and second lines of bearing 304, 306 may be shared to determine an intersection 310 where the target wireless device is located. Although only two location devices have been illustrated in this example for simplicity, it should be noted that other systems may have more than two location devices.

Location monitoring systems may be installed around corporate, university, or military campuses, and could even be installed for entire cities or countries. Such systems could be used to detect wireless "intruders", locate machines conducting criminal activity, or locate known "criminal" machines (by monitoring for known MAC addresses, alerting when one is detected, and specifying where it is).

The disclosed location apparatus and/or methods or their equivalents could be integrated into wireless access points, for example into a CISCO® LinkSys® router, for cooperation with other fixed or mobile location devices to show how many machines are connected to the access point and their physical locations. Such devices could optionally be configured to send an intruder alert to the network owner, administrator, or law enforcement. Functionally, such devices could also be configured to allow an administrator to set a virtual perimeter for their access point, regardless of the actual coverage area, whereby wireless devices outside of that virtual perimeter would not be allowed to connect from outside the virtual perimeter. Alternatively, advertising or other messaging may be sent to any machine that attempts to connect from outside the virtual perimeter (or inside it, or from any defined geography within range of the access point).

The disclosed embodiments and their equivalents could be used by Internet Service Providers to monitor for theft of service by installing the location apparatus in service vehicles and driving through a service area.

The disclosed embodiments and their equivalents could be used in conjunction with subscriber or free hot-spots being offered in some locations in order to collect usage data by wireless device location and/or route advertising by physical location within the hot zone.

As mentioned in the background, terrorists are frequently using cell phones or other wireless devices to detonate improvised explosive devices (IED's). The disclosed embodiments and their equivalents could be used by the military or law enforcement officers to locate IED controllers equipped with wireless technology and/or the wireless remote detonator.

Having thus described several embodiments of a method and system for locating a target wireless device, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. For example, although the embodiments discussed herein have been focused on using antenna sweeps which are substantially horizontal, it is possible to perform the same analysis using antenna sweeps which are not horizontal or purely horizontal. An azimuth system could be used in some embodiments to determine a set of elevation information during antenna sweeps. In such an embodiment, a line of bearing to a target wireless device could also have an elevation component for assistance in locating target wireless devices with more accuracy. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. A method for locating a target wireless device, comprising:
   sweeping at least one directional antenna through a field of view at each of a plurality of sensing locations;
   determining a position for each of the plurality of sensing locations;
   during the sweep at each of the plurality of sensing locations, collecting a set of signal strength data for the target wireless device and a set of bearing information;
   determining a plurality of lines of bearing, one from each of the plurality of sensing locations to the target wireless device, based on the determined position, collected set of signal strength data, and bearing information for each of the plurality of sensing locations; and
   determining a target location of the target wireless device based on an intersection of at least two lines of bearing from the plurality of lines of bearing.

2. The method of claim 1, wherein the at least one directional antenna comprises a single directional antenna moved between each of the plurality of sensing locations.

3. The method of claim 1, wherein the sweeping action is selected from the group consisting of:
   manually sweeping the at least one directional antenna through the field of view at each of one or more of the plurality of sensing locations;
   dynamically beam steering the at least one directional antenna though the field of view at each of one or more of the plurality of sensing locations; and
   electromechanically sweeping the at least one directional antenna though the field of view at each of one or more of the plurality of sensing locations.

4. The method of claim 1, wherein sweeping the at least one directional antenna through the field of view at each of the plurality of sensing locations comprises sweeping the at least one directional antenna substantially horizontally through the field of view at each of the plurality of sensing locations.

5. The method of claim 1, wherein the field of view at least one of the plurality of sensing locations comprises at least 360 degrees.

6. The method of claim 5, wherein the field of view at least one of the plurality of sensing locations comprises less than 360 degrees.

7. The method of claim 1, wherein collecting the set of signal strength data for the target wireless device during the sweep at each of the plurality of sensing locations comprises measuring a set of signal strengths for received transmissions at each of the plurality of sensing locations from the target wireless device.

8. The method of claim 7, wherein the received transmissions at each of the plurality of sensing locations are selected from the group consisting of
   a control frame;
   a management frame; and
   a data frame.

9. The method of claim 1, wherein the position determined for at least one of the plurality of sensing locations is determined using:
   a global positioning system (GPS) device;
   an enhanced GPS device;
   an inertial navigation system;
   survey benchmarks; or
   a dedicated radio frequency (RF)-based location system.

10. The method of claim 1, wherein the set of bearing information for each of the plurality of sensing locations is determined using a digital compass.

11. The method of claim 1, wherein:
   the plurality of sensing locations comprises at least a first sensing location and a second sensing location; and
   the second sensing location is chosen to be substantially on a vector approximately forty-five degrees away from a first line of bearing as measured from the first sensing location.

12. The method of claim 1, further comprising:
   selecting the target wireless device from a listing of wireless devices collected either through a preliminary sweep of the at least one directional antenna or from preliminary readings of at least one omnidirectional antenna.

13. The method of claim 1, wherein collecting the set of signal strength data for the target wireless device during the sweep at each of the plurality of sensing locations comprises passively collecting the set of signal strength data for the target wireless device.

14. The method of claim 1, further comprising adjusting one or more user interface feedback mechanisms while collecting the set of signal strength data for the target wireless device during the sweep at each of the plurality of sensing locations to indicate a relative signal strength of the target wireless device during the sweeping action at each of the plurality of sensing locations.

15. The method of claim 14, wherein the one or more user interface feedback mechanisms are selected from the group consisting of:
   an arcuate graph;
   a digital meter;
   a bar graph;
   an auditory alert;
   a vibration alert; and
   a silent alert.

16. The method of claim 1, further comprising displaying the plurality of sensing locations and the plurality of lines of bearing on a map.

17. The method of claim 16, further comprising highlighting an intersection of at least two of the plurality of lines of bearing on the map.

18. The method of claim 1 further comprising ignoring one or more of the plurality of lines of bearing before determining the target location of the target wireless device based on the intersection of at least two lines of bearing from the plurality of lines of bearing.

19. The method of claim 1, further comprising sending at least one transmission to the target wireless device to cause the target device to emit transmissions which may be used in the collecting of the set of signal strength data for the target wireless device at at least one of the plurality of sensing locations.

20. The method of claim 1, comprising not saving or looking at protectable data transmitted by the target wireless device until a conscious instruction is made to save or look at the protectable data.

21. The method of claim 1, wherein the determination of a line of bearing from each sensing location based on the determined position, the collected set of signal strength data, the and bearing information for each sensing location comprises:
creating a first list of bearings and the average signal strength value received at each bearing from the collected set of signal strength data and bearing information for the sensing location;
identifying a maximum signal strength value in the first list;
defining a signal threshold based on the maximum signal strength value;
adding all pairs of bearing and average signal strength values from the first list having an average signal strength value above the signal threshold to a second list; and
averaging the bearing values in the second list to determine a line of bearing to the target wireless device from the determined position.

22. The method of claim 1, further comprising:
during the sweep at each of the plurality of sensing locations, collecting a set of elevation data; and
wherein determining the plurality of lines of bearing, one from each of the plurality of sensing locations to the target wireless device, based on the determined position, collected set of signal strength data, and bearing information for each of the plurality of sensing locations is further based on the collected set of elevation data.

23. An apparatus for locating a target wireless device, comprising:
a) a directional antenna configured to be swept through a field of view at each of a plurality of sensing locations;
b) a positioning system configured to determine each of the plurality of sensing locations;
c) a compass configured to determine bearing information for the directional antenna;
d) a user interface; and
e) a processor coupled to the directional antenna, the positioning system, the compass, and the user interface, wherein the processor is configured to:
1) collect a set of signal strength data for transmissions received from the target wireless device by the directional antenna during a sweep of the directional antenna at each of the plurality of sensing locations;
2) determine a position from the positioning system for each of the plurality of sensing locations;
3) collect a set of bearing information from the compass for each set of signal strength data;
4) determine a plurality of lines of bearing, one from each of the plurality of sensing locations to the target wireless device, based on the determined position, collected set of signal strength data, and collected set of bearing information for each of the plurality of sensing locations;
5) determine a target location of the target wireless device based on an intersection of at least two lines of bearing from the plurality of lines of bearing; and
6) display the target location on the user interface.

24. The apparatus of claim 23, wherein the directional antenna comprises a manually aimable directional antenna.

25. The apparatus of claim 23, wherein the directional antenna comprises a phased array antenna configured for dynamic beam steering.

26. The apparatus of claim 23, wherein the positioning system is selected from the group consisting of:
a global positioning system (GPS) device;
an enhanced GPS device;
an inertial navigation system
survey benchmarks; and
a dedicated radio frequency (RF)-based location system.

27. The apparatus of claim 23, wherein the compass comprises a digital compass.

28. The apparatus of claim 23, wherein the user interface comprises a feedback mechanism configured to indicate a relative signal strength of the target wireless device during a sweep of the directional antenna at each of the plurality of sensing locations.

29. The apparatus of claim 23, wherein the user interface comprises a list of wireless devices from which the target wireless device is selectable.

30. The apparatus of claim 23, wherein the user interface comprises a map on which the plurality of sensing locations and the plurality of lines of bearing are displayed.

31. The apparatus of claim 30, further wherein the intersection of at least two of the lines of bearing is highlighted on the map.

32. The apparatus of claim 23, further comprising at least one data storage coupled to the processor and wherein the processor is further configured to selectably store protectable data transmitted by the target wireless device on the at least one data storage.

33. The apparatus of claim 32, wherein the at least one data storage is selected from the group consisting of:
a hard disk;
a database;
an optical disc;
an internal memory; and
a removable memory.

34. A system for locating a target wireless device, comprising:
a) a plurality of directional antennas, each configured to be swept through a field of view at one or more sensing locations;
b) a plurality of compasses, each of the plurality of compasses configured to determine bearing information for one of the plurality of directional antennas;
c) at least one user interface; and
d) at least one processor coupled to the plurality of directional antennas, the at least one compass, and the at least one user interface, wherein the at least one processor is configured to:
1) collect multiple sets of signal strength data from transmissions received from the target wireless device by the plurality of directional antennas during a sweep of the plurality of directional antennas at the one or more sensing locations;

2) collect multiple sets of bearing information from the plurality of compasses, each of the sets of bearing information corresponding to one of the multiple sets of signal strength data;

3) determine a plurality of lines of bearing, one from each of the one or more sensing locations to the target wireless device, based on the collected sets of signal strength data and bearing information for each of the plurality of sensing locations;

4) determine a target location of the target wireless device based on an intersection of at least two lines of bearing from the plurality of lines of bearing; and 5) display the target location on the at least one user interface.

35. The system of claim 34, wherein each of the plurality of directional antennas is selected from the group consisting of:
a manually aimable directional antenna;
a phased array antenna configured for dynamic beam steering; and
an electromechanically aimable directional antenna.

36. The system of claim 34, further comprising at least one positioning system configured to determine one or more sensing locations for at least one of the plurality of directional antennas.

37. A set of instructions, embodied on a-non-transitory-computer readable medium, for locating a target wireless device, comprising:
instructions for sweeping at least one directional antenna through a field of view at each of a plurality of sensing locations;
instructions for determining a position for each of the plurality of sensing locations;
during the sweep at each of the plurality of sensing locations, instructions for collecting a set of signal strength data for the target wireless device and a set of bearing information;
instructions for determining a plurality of lines of bearing, one from each of the plurality of sensing locations to the target wireless device, based on the determined position for each of the plurality of sensing locations, the collected set of signal strength data for each of the plurality of sensing locations, and the bearing information for each of the plurality of sensing locations; and
instructions for determining a target location of the target wireless device based on an intersection of at least two lines of bearing from the plurality of lines of bearing.

38. A graphical user interface for use on an apparatus for locating a target wireless device, the apparatus having a directional antenna, the graphical user interface comprising:
a device list configured to display information identifying one or more wireless devices;
bearing information for the directional antenna;
a signal strength indicator for wireless transmissions received by the directional antenna;
a lock control configured to select one of the one or more identified wireless devices as the target wireless device for location and to initiate the determination of one or more lines of bearing toward the target wireless device; and
a coordinate display configured to show a location of the target wireless device as determined from an intersection of a plurality of the one or more lines of bearing.

39. The graphical user interface of claim 38, wherein the coordinate display configured to show the location of the target wireless device comprises:
a direction indicator configured to show the direction from a current position to the target wireless device; and
a distance indicator configured to show a distance from the current position to the target wireless device.

40. The graphical user interface of claim 38, wherein the coordinate display configured to show the location of the target wireless device comprises a map configured to display:
a current position and bearing;
the determined one or more lines of bearing; and
an intersection of a plurality of the one or more lines of bearing.

* * * * *